United States Patent [19]
Wilson

[11] Patent Number: 5,557,734
[45] Date of Patent: Sep. 17, 1996

[54] CACHE BURST ARCHITECTURE FOR PARALLEL PROCESSING, SUCH AS FOR IMAGE PROCESSING

[75] Inventor: Stephen S. Wilson, Ann Arbor, Mich.

[73] Assignee: Applied Intelligent Systems, Inc., Ann Arbor, Mich.

[21] Appl. No.: 261,538

[22] Filed: Jun. 17, 1994

[51] Int. Cl.⁶ .................................................... G06F 15/00
[52] U.S. Cl. .......................................... 395/162; 395/164
[58] Field of Search .................................. 395/162–166, 395/800; 382/303, 304; 364/748

[56] References Cited

U.S. PATENT DOCUMENTS

| | | | |
|---|---|---|---|
| 3,537,074 | 10/1970 | Stokes et al. | |
| 3,582,899 | 6/1971 | Semmelhaack | 395/800 |
| 3,970,993 | 7/1976 | Finnila | 395/800 |
| 4,174,514 | 11/1979 | Sternberg | 382/303 |
| 4,215,401 | 7/1980 | Holsztynski et al. | 382/304 |
| 4,314,349 | 2/1982 | Batcher | 364/716 |
| 4,484,346 | 11/1984 | Sternberg et al. | 382/303 |

(List continued on next page.)

FOREIGN PATENT DOCUMENTS

| | | |
|---|---|---|
| 0006748 | 1/1980 | European Pat. Off. |
| 0146966 | 7/1985 | European Pat. Off. |
| 0150449 | 8/1985 | European Pat. Off. |
| 0293700 | 12/1988 | European Pat. Off. |

OTHER PUBLICATIONS

Fisher, A. L., "Scan Line Array Processors for Image Computation", Jun. 1986, pp. 338–345 IEEE Conference Proceedings, 13th Annual Int'l Symposium on Computer Architecture.

Budzinski, et al., "A Restructruable Integrated Circuit for Implementing Programmable Digital Systems" Mar. 1982, pp. 43–54, Computer, vol. 15, No. 3.

(List continued on next page.)

Primary Examiner—Mark R. Powell
Assistant Examiner—U. Chauhan
Attorney, Agent, or Firm—Rader, Fishman & Grauer PLLC

[57] ABSTRACT

A parallel processing system for processing data matrices, such as images, is disclosed. The system includes a plurality of processing units, organized in four blocks of eight processing units per processing chip, and external cache burst memory, wherein each processing unit is associated with at least one column of the external memory. A barrel shifter connected between the memory and the processing units allows data to be shifted to adjacent processing chips, thus providing the means for connecting several of the chips into a ring structure. Further, digital delay lines are connected between the barrel shifter and the processing units, thus providing the capability of delaying, via a predetermined number of clock cycles, incoming column data. Each processing unit is provided with a nine bit cache memory. The system further includes a controller for each chip that sequences a burst of consecutive rows of a data matrix from the external cache burst memory, to be stored in either the cache memory associated with each of the processing units or routed directly to the processors included in each processing unit.

The barrel shifters and the delay lines cooperate to bring horizontally and vertically displaced data points in the external memory to a single processing unit in a single clock cycle period. The controller decodes instructions stored in the external memory, wherein each processing unit receives the same instruction at any given cycle; this decoded instruction is valid for subsequent data bursts from external memory, thus providing the means for allowing instructions and data to be stored in the same external memory without a significant performance penalty. Where the width of an image is greater than the number of processing units, the image must be segmented to be stored in memory. An efficient method of relating column data across segment boundaries is thus provided, using the cache memory of selected processing units.

62 Claims, 9 Drawing Sheets

U.S. PATENT DOCUMENTS

| | | | |
|---|---|---|---|
| 4,524,455 | 6/1985 | Holstynski | 382/303 |
| 4,525,797 | 6/1985 | Holden | 364/788 |
| 4,541,116 | 9/1985 | Lougheed | 382/303 |
| 4,546,428 | 10/1985 | Morton | 395/800 |
| 4,550,437 | 10/1985 | Kobayashi et al. | 382/304 |
| 4,580,215 | 4/1986 | Morton | 395/800 |
| 4,612,628 | 9/1986 | Beauchamp et al. | 364/748 |
| 4,621,339 | 11/1986 | Wagner et al. | 395/800 |
| 4,635,292 | 1/1987 | Mori et al. | 382/304 |
| 4,665,556 | 5/1987 | Fukushima et al. | 382/304 |
| 4,685,144 | 8/1987 | McCubbrey et al. | 382/303 |
| 4,731,724 | 3/1988 | Michel et al. | 395/280 |
| 4,736,288 | 4/1988 | Shintani et al. | 395/375 |
| 4,739,474 | 4/1988 | Holsztynski et al. | 395/800 |
| 4,742,552 | 5/1988 | Andrews | 382/303 |
| 4,763,294 | 8/1988 | Fong | 364/748 |
| 4,780,842 | 10/1988 | Morton et al. | 364/748 |
| 4,787,057 | 11/1988 | Hammond | 364/754 |
| 4,829,585 | 5/1989 | Pape | 382/277 |
| 4,858,163 | 8/1989 | Boreland | 364/715.03 |
| 4,866,651 | 9/1989 | Bleher et al. | 364/748 |
| 4,872,133 | 10/1989 | Leeland | 364/748 |
| 5,129,092 | 7/1992 | Wilson | 395/800 |
| 5,268,856 | 12/1993 | Wilson | 364/748 |
| 5,410,649 | 4/1995 | Gove | 395/161 |
| 5,428,804 | 6/1995 | Davies | 395/800 |
| 5,450,603 | 9/1995 | Davies | 395/800 |

OTHER PUBLICATIONS

Kondo, et al., "An LSI Adaptive Array Processor," Apr. 1993, pp. 147–156, IEEE Journal of Solid–State Circuits, vol. SC–18, No. 2.

Graham, et al., "Parallel Algorithms and Architectures for Optical State Estimation," Nov. 1985, pp. 1061–1068, IEEE Transactions on Computers, vol. 34, No. 1.

O'Leary, D. P., "Systolic Arrays for Matrix Transpose and Other Reorderings," Jan. 1987, pp. 117–122, IEEE Transactions on Computers, vol. C–36, No. 1.

Fountain, T. J., "A Survey of Bit–Serial Array Processor Circuits," 1983, pp. 1–14, Computing Structures for Image Processing.

Danielsson, P. E., "LIPP—Proposals for the Design of and Image Processor Array," 1983, pp. 157–178, Computing Structures for Image Processing.

Ralston, et al., Encyclopedia of Computer Science and Engineering, pp. 14–15 and 714 (2nd Ed. 1983).

Wilson, S. S., "The Pixie–5000—A Systolic Array Processor," (1985), pp. 477–483 (1985) Workshop on Computer Architecture for Pattern Analysis and Image Data Base Management.

Strong, J. P. "Basic Imaging Processing Algorithms on the Massively Parallel Processor," (1982), pp. 48–52, Multi-computers and Image Processing.

A. L. Fisher, et al., "Architecture of VLSI SIMD Processing Element, " Oct. 1987, pp. 324–327, IEEE International Conference on Computer Design: VLSI in Computers.

A. L. Fisher and P. Highnam, "Real–Time Image Processing on Scan Line Array Processors," Nov. 1985, pp. 484–489, IEEE Workshop on Pattern Analysis and Image Data Base Management.

"Computing Speeds Soar with Parallel Processing," Jun. 1988, pp. 49–58, Computer Design "Parallel–Processing Concepts Finally Come Together in Real Systems," Jun. 1987, pp. 51–74 Computer Design.

CACHE BURST ARCHITECTURE FOR PARALLEL PROCESSING, SUCH AS FOR IMAGE PROCESSING

FIELD OF THE INVENTION

This invention relates to systems and methods for the processing and analysis of spatially related data arrays, such as images, by means of a large array of programmable computing elements.

BACKGROUND OF THE INVENTION

A number of systems have been developed which employ a large array of simple bit-serial processors, each receiving the same instruction at any given time from a central controller. These types of systems are called "Single Instruction Multiple Data" (SIMD) parallel processors. There are various methods for communicating data from one processor to another. For example, the massively parallel processor described in K. E. Batcher, "Design of a Massively Parallel Processor," IEEE Transactions on Computers, September, 1980, pp. 836–840, contains an array of 128×128 processors where image processing is an important application. Data is communicated between neighboring processing elements when an instruction that requires a neighborhood operation is performed. Image data arrays with dimensions larger than 1024×1024 are not uncommon. Since processor arrays this large are not economically feasible, the array must be broken into smaller data array sizes with dimensions equivalent to the size of the processor array. There are other types of SIMD processors, but they also generally experience the problem of data arrays larger than processor array. Generally, for all these systems, all the memory associated with the processors is not large enough to hold the entire image along with extra memory capacity for intermediate computational results.

Thus, a large external memory is necessary, and mechanisms must be able to handle the input and output of small subarray segments at high speed to preserve computing efficiency. Even if enough memory were supplied to each processor, so that the total memory associated with the ensemble of processors could not contain the entire large array of image data, there would still remain the problem of communicating data between the various subarrays when neighborhood operations are performed. During an instruction clock cycle, every processor receives the output of its associated memory, so that processors on the edge of the array cannot receive data from neighboring subarrays because all memories are already engaged in reading an entire subarray. Thus, multiple clock cycles would be needed in reading data when subarray and neighboring subarray data are both needed in the computation. Generally, SIMD processors are less efficient in handling global processes where large areas of the data matrix must be analyzed, such as in histograms, feature extractions, and spatial transforms, such as Hough Transforms and Fourier Analysis.

Indirect addressing is an important processing concept, but the difficulties with implementing it in a parallel processing environment have been recognized in the literature. See, for example: A. L. Fisher and P. T. Highnam, "Real Time Image Processing on Scan Line Array Processors," IEEE Workshop on Pattern Analysis and Image Database Management, Nov. 18–20, 1985, pp. 484–489; and P. E. Danielson and T. S. Ericsson, "LIPP-Proposals for the Design of an Image Processor Array," Chapter 11, pp. 157–178, COMPUTING STRUCTURES FOR IMAGE PROCESSING (Ed. M. J. B. Duff, Academic Press, 1983). Larger amounts of memory are required for indirect addressing to be useful because applications, such as look-up-tables or histograms, which can benefit from indirect addressing, also require a large amount of memory. To usefully access such a large amount of memory, indirect addressing typically requires the use of at least byte wide address words to address byte wide data words; however, a separate byte wide indirect addressing circuit at the site of each bit-serial processor would greatly complicate the parallel processing circuit. One solution to this problem is disclosed in U.S. Pat. No. 5,129,092, wherein eight bit-serial processing elements share the burden of providing the indirect addressing of byte wide words. In that disclosure, bits of data words are read from memory external to the processing chip and are distributed to groups of eight processing units. These data words are then used as an address to the external memory.

Many of the highest performance microprocessors use internal cache memory as a means to effectively speed up memory references. Such a microprocessor is generally able to reference the internal cache memory much faster than it is able to reference external memory; therefore, the use of the internal cache memory allows the use of lower speed, lower cost, bulk memory. The lowest cost bulk memories are characterized in their ability to supply data to the microprocessor cache in bursts from consecutive sequences of addresses. A number of these so-called cache burst memories, such as, for example, video random access memories (VRAM), are now commercially available. SIMD processors, however, often require memory in address patterns that are not in a consecutive sequence. Since the above-mentioned cache burst memories cannot meet this requirement, SIMD processors must forego their use and rely on higher cost static RAM (SRAM).

State-of-the-art microprocessors generally contain a controller that is able to read instructions from memory, decode those instructions, and operate on data in accordance with the decoded instruction. When instructions and data are stored in the same memory, the microprocessor must read both of them through the same inputs, thereby reducing the effective throughput of both the instructions and data, thus further degrading the memory bottleneck. Usage of cache memory internal to the microprocessor allows instructions and data to be stored in different caches and be simultaneously addressed, thereby improving the memory bandpass internally. A controller that reads and decodes instructions in a SIMD machine has not used the same external memory for storage of instructions and data because a SIMD system generally must change the instruction every clock cycle. If the instructions reside in the same external memory as that used for storing data, the processing speed would drop in half because of the need to update the instructions before each data fetch. Thus, two external independent memory systems are generally used in SIMD systems: one to store array data and one to store instructions.

Therefore, a primary object of the present invention is to provide a simple method to allow a fixed array of processors to handle a large array of data while performing operations which require neighborhood and global processing of data.

Another object of the invention is to provide an effective method of indirect addressing of memory which operates independently for each SIMD processor in the processor array.

A further object of the invention is to provide a means of handling large arrays of data without resorting to memories and associated input and output mechanisms remote from the processing array.

Another object of this invention is to provide a means to handle contiguous high-speed bursts of data from consecutive addresses so that lower cost cache burst memories can be used.

Another object of this invention is to provide a controller means in a SIMD system that is capable of fetching both array data and instructions from the same external memory without suffering from a large loss in speed.

SUMMARY OF THE INVENTION

This invention provides for an improved method and apparatus for several aspects of handling and processing arrays of data and processing unit instruction data. In parallel processing operations, it is quite often desirable to present data stored in horizontally displaced columns of memory to a single processing unit. Accordingly, in one aspect of the present invention, a method is provided for transferring data between a memory means having L rows and M columns and an array of processing units wherein each of the processing units is associated with a column of memory means comprising the step of shifting, in a first clock cycle, each bit of a first row of M data bits from the memory means one or more column positions to the processing unit associated with respectively adjacent columns of the memory means. A further step of this aspect of the invention includes transferring, in the first clock cycle, each bit of the first row of M data bits to the respectively associated processing unit so that horizontally displaced data values from the memory means are presented to each of the M processing units in the first clock cycle. In the related apparatus of this aspect of my invention, there is provided, in combination, a memory means having L rows and M columns for storing a data matrix, an array of M processing units, and a shifting means coupled to the memory means and to the array of M processing units for shifting, in a first clock cycle, each bit of the first row of M bits of data from the M coles of the memory means one or more column positions. Further, in parallel processing operations, it is often desirable to present to each of the processing units data vertically displaced in one of the columns of the memory means to the processing units during the same clock cycle. Thus, the method of this first aspect of my invention further provides the step of delaying each bit in the first row of M data bits shifted in the above mentioned shifting step by one or more clock cycles so that vertically displaced data values from the memory means are presented to each of the M processing units in one clock cycle. In the related apparatus of this first aspect of my invention, a delaying means is provided for delaying each shifted bit in the first row of M data bits shifted by the shifting means by one or more clock cycles. In this first aspect, horizontally and vertical displaced data in memory can be presented to the processing units in one clock cycle.

One problem associated with the use of low cost burst memory in a parallel processing system is related to the fact that some operations require more operands than can be burst in from memory in one burst cycle. According to a second aspect of my invention, there is provided a method for transferring data between a first memory means having L rows and M columns and an array of M processing units, wherein each processing unit is associated with a respective plurality of second memory means. The method comprises the steps of (a) bursting data in sequential row order from a first plurality of consecutive rows of the first memory means to a first one of the second memory means associated with each of the M processing units wherein the bursted data is stored in the first one of the second memory means; and (b) transferring array data stored in step (a) to the array of processing units, including bursting the array data stored in step (a) from each one of the second memory means to the respective processing unit. In the related apparatus of this aspect of my invention, there is provided an apparatus for transferring data, comprising: a first memory means having L rows and M columns for storing an array of data; an array of M processing units, each of said processing units being respectively associated with one of said M columns of said first memory means for performing operations in parallel upon said array of data, each of said processing units being associated with a plurality of second memory means; first bursting means coupled to said M coles of first memory means and to said respective second memory means associated with said M processing units for bursting array data in sequential row order from a first plurality of consecutive rows of said first memory means to a respective first one of said second memory means associated with each of said M processing units; and means coupled with said plurality of second memory means and said M processing units for transferring stored array data from each first one of said second memory means to said array of M processing units, including second bursting means for bursting said stored array data from each first of one said second memory means to the respectively associated one of said array of M processing units. When the method is expanded such that a plurality of data bursts fill a plurality of the second memory means, and the data is then burst from the plurality of second memory means to the processing units, then the problem in the prior art relating to the use of cache burst memory for multiple operand operations is overcome.

In general, in parallel processing systems, data array widths often exceed the practical limit in the width of the number of processing units in the system thus necessitating the segmenting of the data array for complete storage in main memory. Thus, the problem arises with respect to relate data across the segment boundary. Therefore, according to a third aspect of the present invention, there is provided a method of relating column data across segment boundaries. The method comprises the steps of: (a) shifting the columns of a first segment at least one column position such that the column of data adjacent a first segment boundary is shifted across the first segment boundary; (b) storing the columns shifted across the first segment boundary in step (a) in a first one of the second memory means of the processing unit to which the shifted column of data is associated; (c) shifting the columns of a second segment the same number of column positions as the first segment was shifted in step (a) such that the column of data adjacent the first segment boundary is shifted away from the first segment boundary; (d) transferring the shifted second segment of column data to the M processing units; and (e) transferring the data stored in the first one of the second memory means in step (b) to the associated processing units such that column data on both sides of the first segment boundary are accessible to the M processing units. In the related apparatus for this aspect of my invention, there is provided, in a parallel processing system, an apparatus for relating column data across a segment boundary. The apparatus comprises: a first memory means having L rows and M columns, for storing a data matrix having P columns, where P is an integer greater than M, wherein the data matrix is stored in the first memory means in a plurality of segments; an array of M processing units wherein each of the M processing units is associated with a column of said first memory means, each processing unit being associated with a plurality of second memory means; shifting means coupled with said first memory means, coupled with said second memory means and coupled with said array of M processing units for shifting the columns of a first segment from said first memory means at least one column position such that a first column of matrix data adjacent a first segment boundary is shifted across said first boundary, wherein said first column of data is stored in a first one of said second memory means of a processing unit to which said shifted column of data is associated, said shifting means being operative to shift the columns of a second segment the same number of column positions as said first segment such that a second column of data adjacent said first boundary is shifted away from said first boundary; first transferring means coupled with said shifting means and said array of M processing units for transferring said shifted second segment of column data to said M processing units; and second transferring means coupled with said second memory means and said processing units associated therewith for transferring said shifted matrix data stored in said first one of said second memory means to said processing unit wherein column data on both sides of said first segment boundary are accessible to said M processing units. Thus, through the use of the second memory means, data on one side of the boundary is retained until a later phase of processing, where it is then Joined with data from the other side of the boundary, thus providing one solution for relating data across segment boundaries.

In parallel processing operations, it is often desirable to change or transpose the format of the data array stored in memory when it is read into the processing units. However, efficient methods and apparatus have been difficult to design. Thus, there is a need for an improved method of changing the format of data as it is transferred to the processing units. According to a fourth aspect of this invention, there is provided an improved method for transferring data between a first memory means having L rows and M blocks of N columns to an array of M blocks of N processing units, wherein each of the M×N processing units are associated with a respective one of the M×N coles of the first memory means. The method comprises the steps of: (a) selecting, for at least certain of the M blocks, one of the N processing units for receiving data; (b) transferring, for blocks having selected processing units from the first memory means a row of N data bits to the respective block of N processing units; and (c) storing, for blocks having selected processing units, each row of N data bits transferred in step (b) in the respective processing unit selected in (a). In the related apparatus corresponding to this aspect of my invention, an apparatus for transferring data is provided. The apparatus comprises: a first memory means having L rows and M×N columns, for storing a data array; an array of M blocks of N processing units for performing operations in parallel upon said array of data, each of said N×M processing units being associated with the respective one of said M×N columns of said memory means; selecting means coupled with said processing units for selecting, for at least certain of said M blocks, one of said N processing units for receiving data; transposing means coupled with said first memory and said array of M×N processing units for transferring, for at least certain of said M blocks, from said first memory means a row of N data bits associated with N processing units to a respective block of N processing units wherein each respective row of N data bits is stored in said respective one processing unit selected by said selecting means. Thus, the ability to select the processing unit in which the changed format data will be stored provides enhanced flexibility. In a like manner, data in a processing unit may be written to memory from a selected processing unit in a block.

Indirect addressing is a useful feature in parallel processing systems, such as for implementing look up tables and generating histograms. However, there exists difficulty in efficiently implementing such feature, especially when a low cost cache burst memory is used. According to a fifth aspect of the present invention there is provided a method of retrieving data using indirect addressing, in a parallel processing system having M blocks of N processing units, where M and N are integers greater than 1, each processing unit being associated with a plurality of memory means. The method comprises the steps of: (a) selecting, for each of the M blocks, one of the N processing units; (b) reading, for each of the M blocks, a respective indirect address from a first group of the plurality of memory means associated with the processing unit selected in step (a); (c) broadcasting for each of the M blocks, the respective indirect address read in step (b) to a second group of the memory means in each of the N processing units of the respective block; and (d) outputting, for each of the M blocks, the data stored at the respective indirect address of the second group of the memory means in each of the N processing units, the collective output defining a respective data word. In the related apparatus of this aspect of my invention, there is provided an apparatus for retrieving data using indirect addressing. The apparatus comprises an array of M blocks of N processing units each processing unit being associated with the plurality of memory means; selecting means coupled with said plurality of memory means for selecting, for each of said M blocks, one of N processing units and for reading, for each of said M blocks, a respective indirect address from a first group of said plurality of memory means associated with each selected processing unit; and broadcasting means responsive to said respective indirect address for broadcasting, for each of said M blocks, said respective indirect address to a respective second group of said plurality of memory means in each of the N processing units of the respective block, wherein each block outputs, data stored at said respective indirect address of the second group of said plurality of memory means in each of the N processing units, the collective output of M second groups for each block defining a respective data word. Thus, once data has been stored in the plurality of memory means for each processing unit, said data can act as an indirect address to a second memory means. Indirect operations can thus effectively be performed.

Another problem in parallel processing systems has been the undesirability of storing instructions and data in the same memory due to the fact that SIMD systems typically must update the instruction before each data fetch. Thus, there is a need for a method and apparatus for allowing the storage of instructions and data in the same memory which would simplify system design. According to a sixth aspect of the present invention, there is provided a method of transferring instructions and matrix data from a memory means to an array of M×N processing units. The method comprises the steps of: (a) transferring instruction data stored in the memory means to a controlling means; (b) decoding the instructions data transferred in step (a) with the controlling means to condition the M×N processing units to receive and process matrix data stored in the memory means; and (c) transferring matrix data from the memory means while the N processing units remain conditioned from (b). In the related apparatus of this aspect of my invention, there is provided, in a parallel processing system, an apparatus for transferring instructions and matrix data from a memory means. The apparatus comprises: a memory means; an array of M blocks of N processing units coupled with said memory means for performing operations in parallel on matrix data according to instructions, wherein said matrix data and said instructions are stored in said memory means; a controller means coupled with said memory means and said array of processing units for fetching instructions from said memory means and for decoding said fetched instructions to conditions said array of M×N processing units to receive and process matrix data stored in said memory means, wherein at least one instruction is fetched and decoded by said controller means, said controller means including data burst means coupled with said memory means for transferring matrix data from said memory means while said M×N processing units remain conditioned in accordance with said instructions fetched and decoded by said controller means. Thus, providing a system wherein the instruction is valid for a long burst of data allows storage of instructions and data in the same memory; the performance penalty is relatively small because many data values may be read in for each instruction, performance being likened to system having dual memories.

These and other aspects, objects, and advantages of the present invention will be more fully understood by reference to the following detailed description taken in conjunction with the various figures and appended claims.

DETAILED DESCRIPTION OF THE PREFERRED EMBODIMENTS

Figure 1:
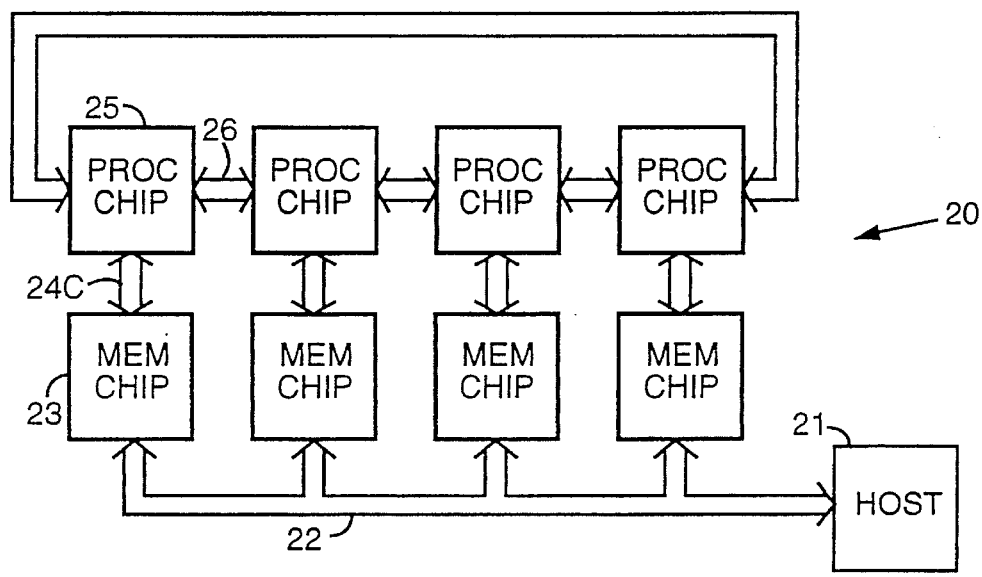
FIG. 1 is an overall block diagram of a parallel processing system of the present invention which employs a plurality of processing chips arranged in a ring structure.

Referring now to the drawings wherein like reference numerals are used to refer to identical components in the various views, FIG. 1 depicts parallel processing system 20 comprising a general purpose a host computer 21, a bus 22, a plurality of external memories 23, a plurality of lines 24C, a plurality of processing chips 25, and a plurality of connections 6. The host 21 can independently read or write data, such as image data obtained from an external source (not shown), or write instructions in memories 23 through bus 22 for use by chip 5. The memory 23 may take the form of a cache burst memory, such as a Video Random Access Memory (VRAM), for example Texas Instruments TMS44C250. The memory 23, as shown in FIG. 1, may be dual-ported, with a first port being of the conventional Dynamic Random Access Memory (DRAM) type. The first port of each memory 23 is connected to host 21 via bus 22. A second port of memory 23 is a Serial Access Memory (SAM) port and is an order of magnitude faster than the first port. The second port of memory 23 is capable of sending or receiving a burst of data to or from a consecutive sequence of addresses. This burst of data is carried out by providing the memory 23 with a starting address on an address bus (not shown), and then providing clock pulses. As clock pulses are received by memory 23, data stored at or are being stored to the consecutive sequence of addresses are transferred through the second port without the need for providing further addresses. Each chip 25 is connected to the second port of a respective memory 23 via lines 24, thus enabling each chip 25 to access the data or instructions stored therein. Each chip 25 is connected to its nearest neighboring chip 25 via connections 26. As shown in FIG. 1, the plurality of chips 25 are connected via lines 26 to form a ring structure. It should be appreciated by those of skill in the art that other topological schemes may be implemented, such as, for example, a hypercube arrangement or a linear chain of processing elements arrangement, rather than the ring structure shown in FIG. 1.

Figure 2:
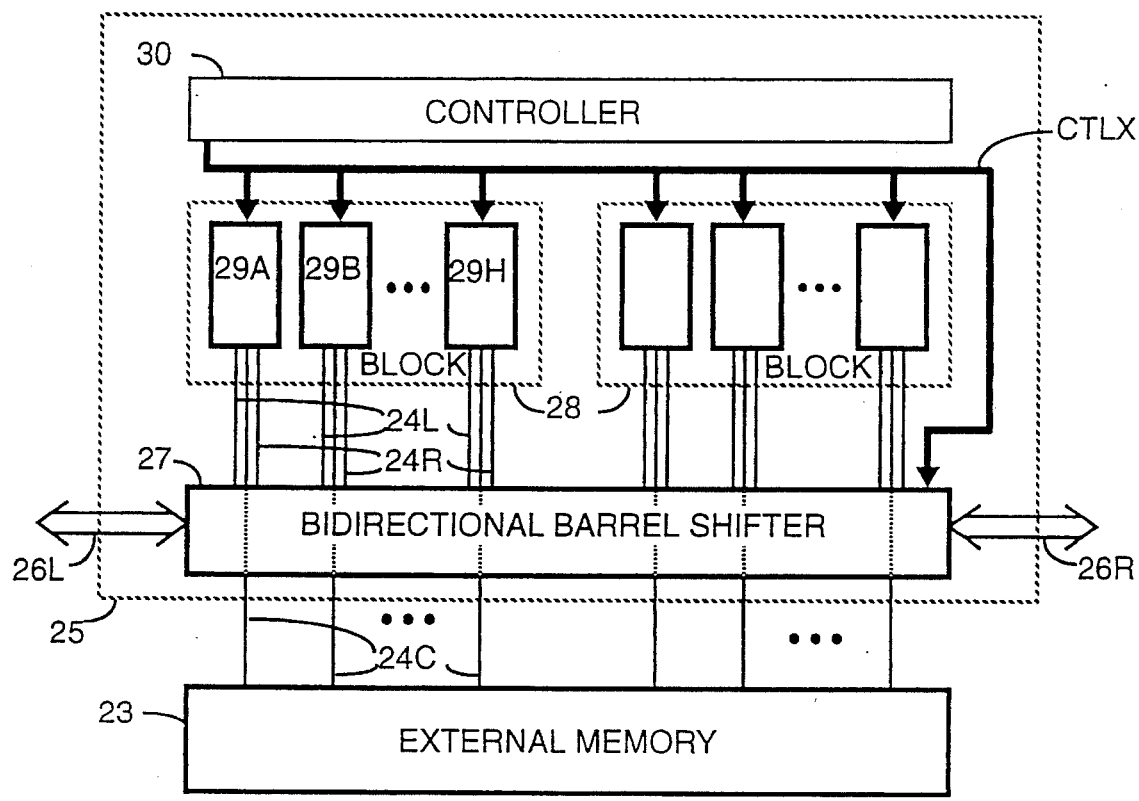
FIG. 2 is a partial block diagram of one of the processing chips shown in FIG. 1 connected with one of the external memory chips shown in FIG. 1.

FIG. 2 shows a single chip 25 connected to a single memory 23. The chip 25 comprises a bidirectional barrel shifter 27 connected to memory 23, a plurality of processing unit blocks 28 connected to the output of barrel shifter 27 wherein each block 28 may include eight individual processing units 29A–29H, and a controller unit 30. Each processing unit 29A–29H is associated with one or more columns of array data stored in memory 23 via lines 24.

The barrel shifter 27 provides a means for transferring or communicating data from one column to another column. The barrel shifter 27 accomplishes this function by shifting data left or right; that is, the values of data at the plurality of lines 24L or 24R, connected to processing units 29A–29H, are displaced respectively left or right with respect to the plurality of lines 24C, each of the lines 24C being connected to a respective column of data stored in memory 23. Data that are shifted to a position outside the range of the processing units 29A–29H are sent to connections 26R at the right or 26L at the left to an adjacent chip 25. The ensemble of barrel shifters 27 of chips 25 act as one large barrel shifter that unifies the communication of data via shifting across all processing units 29.

Some of the operations performed by this invention, for example, transposing data from memory 23, described below, are performed on a per-block 28 basis. Although FIG. 2 depicts two blocks 28, this representation is for purposes of clarity only; preferably each chip 25 includes four blocks 28. Thus, since each block 28 includes 8 processing units 29A–29H, each chip 25 includes 32 processing units 29.

The controller unit 30 sequences bursts of data or commands in consecutive addresses from the associated memory 23. Commands are stored in registers associated with controller 30, as described in greater detail below, that are connected to many areas of chip 25, illustrated and referenced in the drawings as control lines CTLX where X is an integer greater than zero. For clarity, not all control lines are referenced or shown.

DATA INPUT/FORMAT

The external memory 23 is provided in system 20 for storing both array or matrix data, and instruction or command data. It should be appreciated that the array or matrix of data may originate from several sources and may be stored in memory 23 in a plurality of formats. Once source of array data may be from an image generation means, for example, an imaging camera wherein the image comprises a plurality of pixels, each pixel being represented by an eight-bit word (e.g., a 256 step gray scale), provided in the form of H rows and W columns. This array of data may be stored in memory 23 by host 21 via bus 22.

Each of the processing units 29A–29H of each block 28 are connected to a 1-bit column of memory 23 via a respective line 24C, as mentioned above. Further, the addresses of memory 23 correspond to rows thereof.

An exemplary format for storing the image data array in the memory 23 array will now be described. The least significant bit (LSB) of each pixel of the first row of the image data matrix is stored in row format in memory 23. It should be appreciated that when the length of the image row is greater than the length of a row in memory 23, multiple rows in memory 23 will be required for complete storage. For example, assume that an image is 512 pixels wide. Also assume that, for this example, a parallel processing system comprises two processing chips 25 that are each connected to a respective memory 23; this configuration provides 64 1-bit coles (i.e., 2 chips×4 blocks/chip×8 processing units/block). Thus, the LSB of the pixels in the first row of image data must be divided into eight shorter rows in memory 23. The whole image of LSBs is divided into 8 ribbons that are each 64 columns wide. The LSBs of the first ribbon of data will preferably be stored in consecutive rows. The LSBs of the second ribbons are each stored in consecutive rows. The LSBs successive ribbons are stored in the same manner. The next LSB of the pixels of the first ribbon of image data will then be stored in consecutive rows, and so on until all ribbons of the next LSB of the pixels in the image are stored. The above process is repeated until all ribbons of the MSB of the image data array are stored in memory 23.

Alternatively, each pixel may be represented by only one bit. In this case, assuming the above-described configuration, eight ribbons of consecutive rows will be required to represent the image data in memory 23.

It should be appreciated that although the above-described format refers to rectangular grids of data arrays having rows and columns, other formats, such as hexagonal grids can also be advantageously employed.

BIDIRECTIONAL BARREL SHIFTER

Figure 3A:
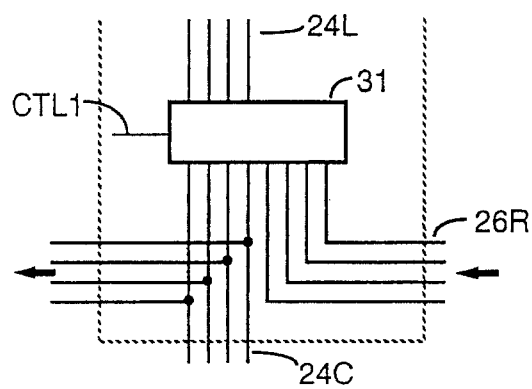
FIGS. 3A–3D depict signal flows illustrating the principles of the barrel shifter shown in FIG. 2.

Referring to FIG. 3A, an example of a small left barrel shifter 31 is shown. The function of a barrel shifter, in general, is to displace the values of an ordered sequence of data signals on a row of wires by an amount specified by a control signal, in one clock cycle. The barrel shifter 31 is capable of shifting data from 0 to 4 units, where the amount of the shift is derived from control line CTL1. The barrel shifter 31 shifts left and has four outputs 24L and eight inputs comprised of connections 26R from an adjacent chip 25 positioned to the right, and lines 24C associated with memory 23. Figure 3B illustrates the barrel shifter 31 of FIG. 3A, through the use of dashed lines, shifting data left by two units. Two lines of data from lines 24C pass through the barrel shifter 31 to outputs 24L and are shifted left by two units. Of the connections 26R, the two lower dashed lines are data from an adjacent chip 25 to the right, and are output from barrel shifter 31 via two of the lines in 24L. The two upper connections that are not dashed in 26R are ignored by barrel shifter 31 in this example. The two lower dashed lines in 26L transmit data to an adjacent chip 25 positioned to the left. The upper two connections that are not dashed in 18L also transmit data to the chip 25 on the left; however, in this example, the data are ignored by that chip 25.

Figure 3C:
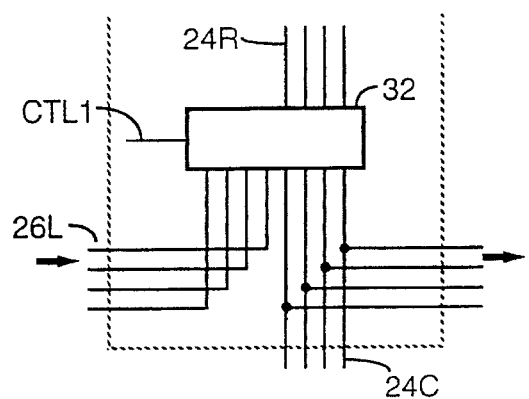
Figure 3B:
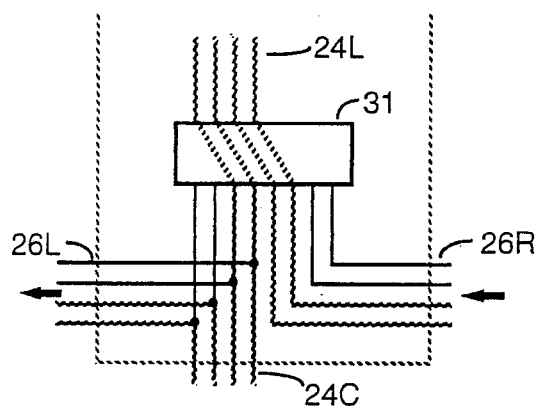
Figure 3D:
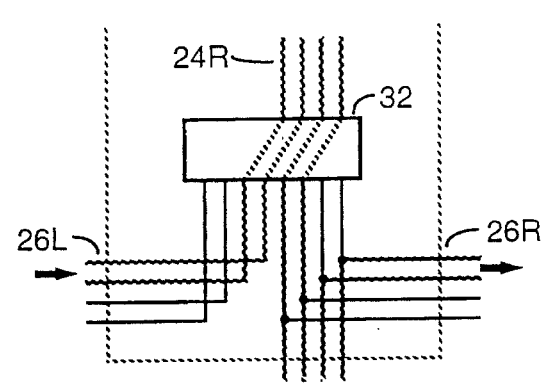

Referring to FIG. 3C, a right barrel shifter 32 is shown that has four output lines 24R, and eight inputs comprised of connections 26L from an adjacent chip 25 positioned to the left, and lines 24C associated with memory 23. The barrel shifter 32 is also controlled by line CTL1 and is capable of shifting data up to four units. FIG. 3D illustrates the barrel shifter 32 of FIG. 3C, through the use of dashed lines, shifting data by two units to the right. Two lines of data from lines 24C pass through the barrel shifter 32, and are shifted by two units. The upper two dashed lines of connection 26L are data from an adjacent chip 25 positioned to the left, and are output from the barrel shifter 32 via two of the lines in 24R. The two lower lines that are not dashed in 26L are ignored by barrel shifter 32 in this example. In the lines 26R, two upper dashed lines transmit data to an adjacent chip 25 positioned to the right. The lower two lines that are not dashed in 26R also transmit data to the chip 25 positioned on the right; however, in this example, that data are ignored by that chip 25.

Figure 4:
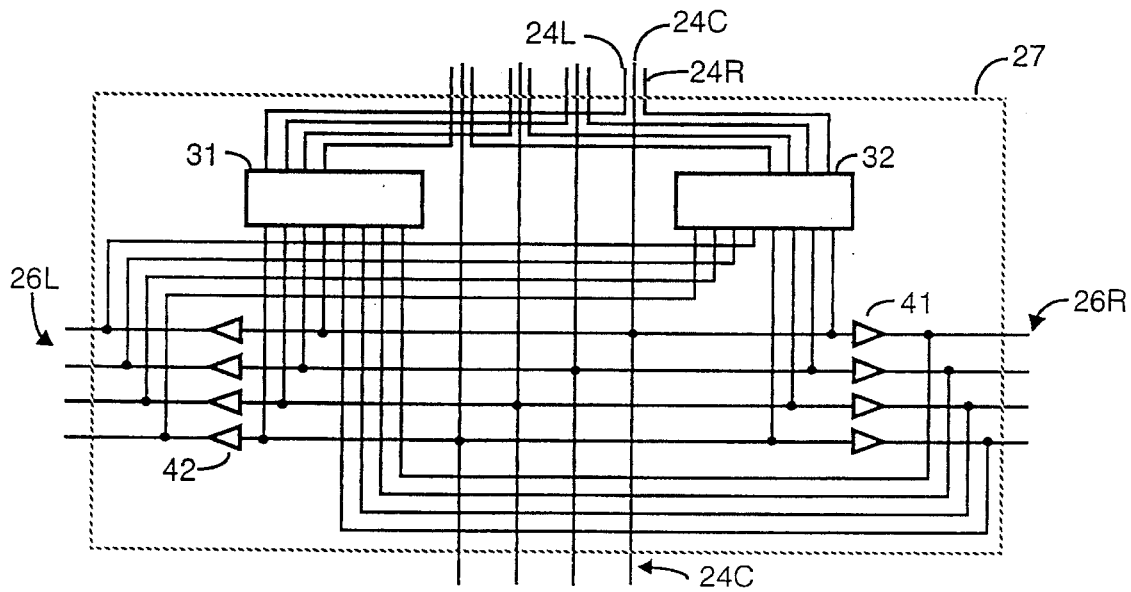
FIG. 4 is a partial schematic and block diagram of the bidirectional barrel shifter of the processing chip shown in FIG. 2.

The left barrel shifter 31 in FIG. 3A and the right barrel shifter 32 in FIG. 3C may be combined to form bidirectional barrel shifter 27, as shown in FIG. 4. The barrel shifter 27 of FIG. 4 is shown with a reduced number of input lines and output lines for clarity; preferably, however, the barrel shifter 27 of each chip 25 has thirty-two input lines 24C, and thirty-two corresponding output triples (i.e., a grouping of one each of lines 24L, 24C and 24R, as shown near the top of FIG. 4). Data lines 24C, 26R and 26L are coupled with both left barrel shifter 31 and right barrel shifter 32. The barrel shifter 27 also includes two sets of tristate gates 41 and 42 for eliminating undesirable data paths during shifting operations. During a left shift operation, gates 42 are open and allowed to pass data to a chip 25 positioned to the left, whereas gates 41 are closed and in the high impedance state so that data on the inputs of gates 41 will not interfere with data on lines tied to the outputs of gates 41. Similarly, during a right shift operation, gates 42 are closed and gates 41 are open.

In addition to separate left or right shift operations, barrel shifter 27 can also be controlled to shift data to the left and to the right simultaneously. Referring to FIG. 3B, during a left shift operation, only the two lower dashed lines of 26L and 26R are used, while, referring now to FIG. 3D, during a right shift operation, only the two upper dashed lines in 26L and 26R are used. Thus, for bidirectional shifts by two or less units, both right and left shifts can occur through lines 26L and 26R without interference. To accomplish such a bidirectional shift without interference, tristate gates 41 and 42 must be controlled accordingly. Thus, during a bidirectional shift, the upper two tristate gates 42 must be closed and in the high impedance state, and the lower two gates 42 must be open to pass data. The upper two tristate gates 41 must be open to pass data, while the lower two tristate gates 41 must be closed and in the high impedance state.

As mentioned above, lines 24L, 24C and 24R occur in triples that correspond to left shifted data, right shifted data, and unshifted data directly from lines 24C associated with memory 23. As shown in FIG. 2, each triple connects to a respective one of the processing units 29A–29H. Since the data on lines 24L, 24C and 24R represent data that is horizontally displaced in memory 23, each triple may be said to present a horizontal aspect of a neighborhood of data points to each of the processing units 29 in one clock cycle. It should be appreciated that a wider barrel shifter 27, with more lines of communication 26 to adjacent chips 25, may be provided to increase the distance, or number of units, of right and left shifting.

It is apparent from the foregoing description that the use bidirectional barrel shifter 27 in each of the chips 25 arranged in a ring as shown in FIG. 2 provides seamless shifting of rows of data bits from external memory 23 across chip 25 boundaries to the array of processing units. The number of units or column positions that a data value may be right or left shifted in one clock cycle can be as high as the number of wires in connections 26. Moreover, the amount of displacement which can occur in a bidirectional shift operation may be as high as half the number of wires in connection 26.

DESCRIPTION OF THE PROCESSING UNIT

Figure 5:
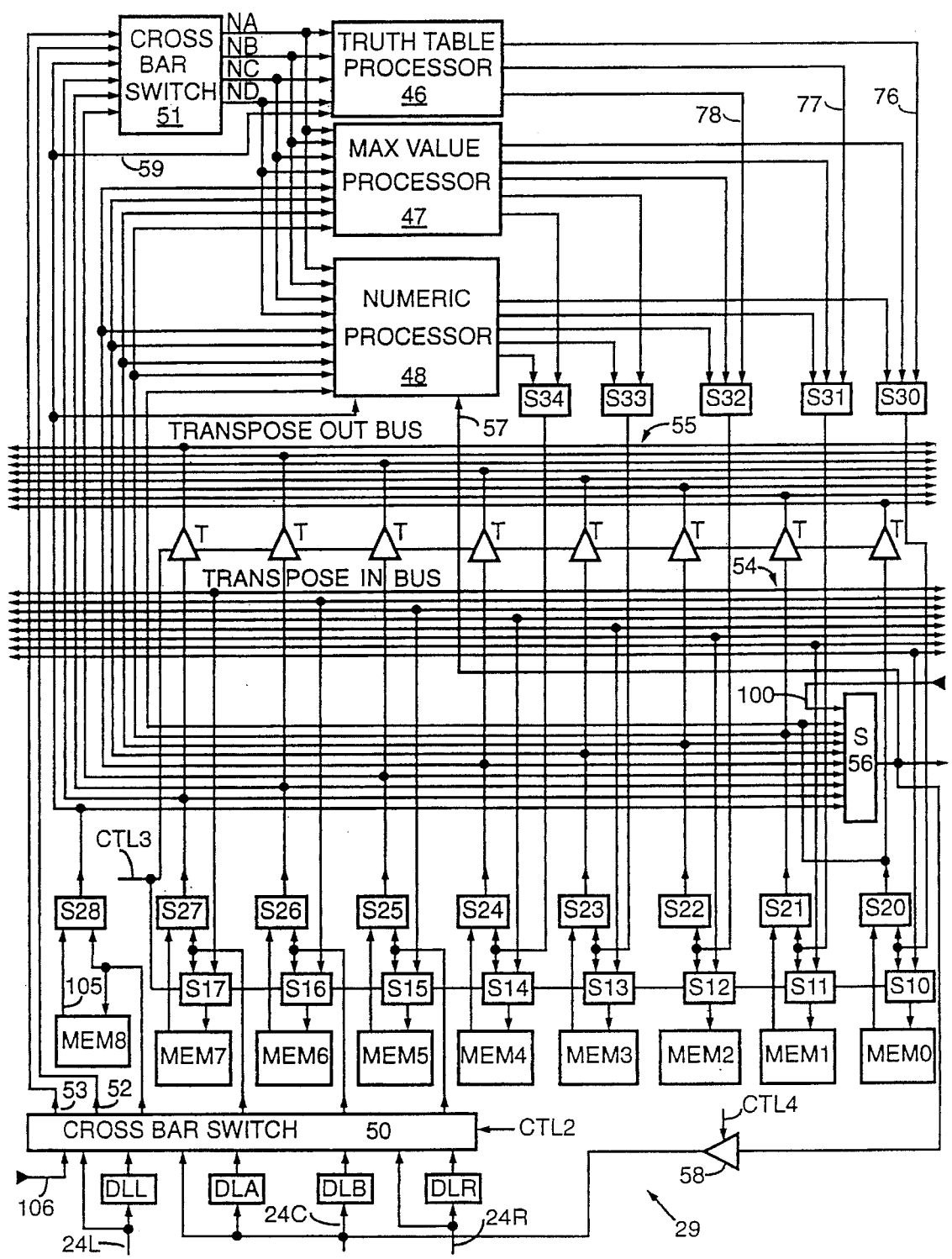
FIG. 5 is a detailed partial schematic and block diagram of one of the processing units shown in FIG. 2, including a plurality of cross bar switches, a plurality of cache memory means, a truth table processor, a maximum value processor, and a numeric processor.

Referring to FIG. 5, a single processing unit 29 of block 28 is shown wherein data flows along lines therein depicted in directions indicated by arrows. The processing unit 29 includes vertical delay lines DLL, DLA, DLB, and DLR, a truth table processor 46, a maximum value processor 47, a numeric processor 48, a first cross bar switch 50, a plurality of cache memories MEM0–MEM8, a plurality of selectors S10–S28, S30–34, and S56, a second cross bar switch 51, a pair of cross bar connecting lines 52 and 53, a transpose in bus 54, a transpose out bus 55, a selector output line 57, a tristate gate 58 and a cache output line 59. The processing unit 29 is also provided with a system clock (not shown). It is well known that one function of a system clock in a digital system such as the present invention is to synchronize a stream of data wherein each clock pulse may be effective to cause new memory references and data that is read therefrom to be processed in sequence. In this invention, data will be burst in a sequential stream of addresses from external memory 23 into a plurality of processing units 29 in each chip 25 of system 20.

Vertical Delay Lines

As described above, each processing unit 29 has associated therewith a respective triple comprising lines 24L, 24C and 24R originating from barrel shifter 27. As shown in FIG. 5, the lines 24L, 24C and 24R are connected to the inputs of digital delay lines DLL, DLA, DLB and DLR. As is well known, delay lines store data internally and transfer the data out at a later time, the later transferred output data retaining the original chronological sequence of the input data. Delay lines DLL, DLA and DLR delay the input data by a first predetermined amount, d1. The delay line DLB delays the input data by a second predetermined amount, d2. The delay lines are essentially shift registers with a controllable length. For each clock pulse from a system clock (not shown), the delay lines store the input data present on lines 24L, 24C and 24R, and output the data stored during a previous clock pulse (either d1 or d2 units prior depending on the delay lines).

Gross Bar Switch

It is well known that a cross bar switch provides a means for transferring a data value on any one of a plurality of data input lines to any one of a plurality of data output lines. Thus, the inputs may be mapped to a predetermined combination of outputs. As shown in FIG. 5, processing unit 9 includes a cross bar switch 50 for receiving input data from a plurality of input sources including lines 24L, 24C and 24R and from the outputs of delay lines DLL, DLA, DLB, DLR. The switch 50 is controlled by the signal on control lines GTL2 to pass a selected combination of the inputs to the outputs. It should be appreciated that a full implementation of a cross bar switch may not be required; i.e., a generalized design solution providing the capability of switching any input to any output may not be needed for some embodiments of the present invention, and may be advantageously optimized and replaced by a simpler set of selectors.

Figure 6:
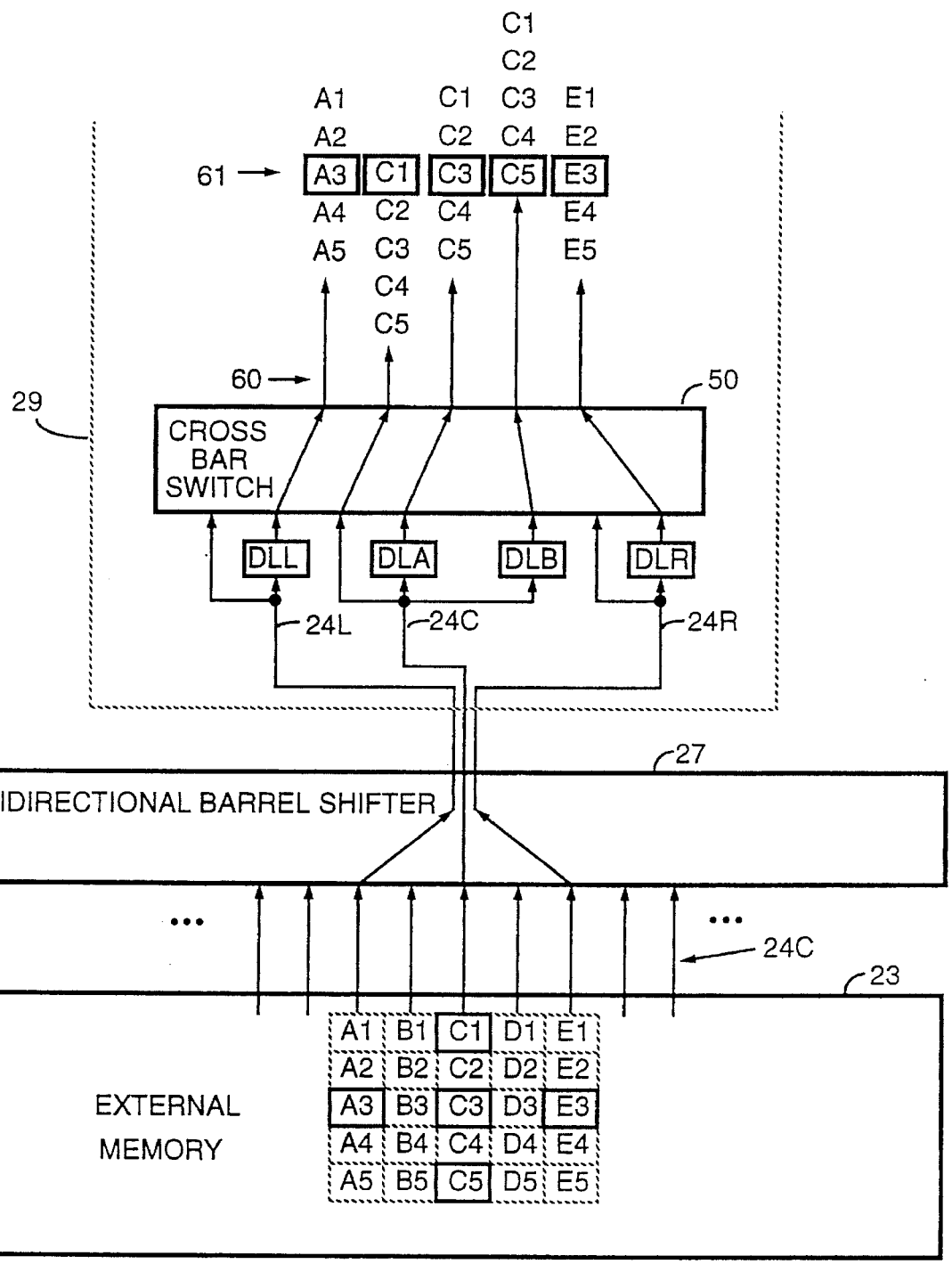
FIG. 6 depicts the signal flow involved in synchronizing a neighborhood of data points originating from external memory so that the neighborhood of data points may be referenced by a processing unit in one clock cycle.

Referring to FIG. 6, a diagram is shown that illustrates the effect of delay lines DLL, DLA, DLB, DLR and switch 50, in conjunction with barrel shifter 27, on data incoming from memory 23. For the data flows of FIG. 6, the delay lines DLL, DLA and DLR are controlled to delay input data by two clock units and the delay line DLB is controlled to delay input data by four clock units, the barrel shifter 27 is controlled to shift data two units left and two units right. A small segment of data matrix values within memory 23 are labeled by a letter and number, where the letter corresponds to a column and the number corresponds to a row. This data matrix is transferred to barrel shifter 27 via lines 24C. The output of barrel shifter 27 is shown for only one processing unit 29 (i.e., a single triple comprising three lines: a left shifted line 24L, an unshifted line 24C, and a right shifted line 24R). The data, after exiting barrel shifter 27 and passing through delay lines DLL, DLA, DLB and DLR, are selected and switched through cross bar switch 50 to lines 60. A row of values 61 show how barrel shifter 27 and delay lines DLL, DLA, DLB and DLR affect the order and arrangement of data values at one processing unit 29. The data in the row of values 61 correspond to the output values of cross bar switch 50 during one clock period.

It should be appreciated that the data values outlined in heavy boxes in memory 23, which occur in different positions and are read out of memory 23 one row at a time, become synchronized in time and relocated to a single processing unit 29, as shown by the heavy boxes in row 61. Comparison of the data values in the input data matrix in memory 23 and the output data row 61 clearly show that the data of a regular neighborhood of values A3, C1, C5 and E3 about and including point C3 are transmitted to the heavy boxes comprising row 61. Further processing in processing unit 29 on those data values are said to occur on a neighborhood of points in the data matrix. In sum, bidirectional barrel shifter 27 is effective to present data stored in horizontally displaced columns of memory 23, for example, A3 and E3, to the same processing unit 29 in one clock cycle.

Further, the delay lines DLL, DLA, DLB and DLR are effective to bring data vertically displaced in a single column, such as C1 and C5, to the same processing unit 29 in one clock cycle. Thus, even though the rows from memory 23 are read in sequentially, the data desired to be operated upon need not be stored in sequential rows. It should be understood that similar processing occurs in each of the plurality of processing elements 29A–29H, for each block 28 of chip 25, as shown in FIG. 1.

Cache Read

Referring to FIG. 5, processing unit 29 includes the plurality of cache random access memories (RAMs) MEM0–MEM8 for providing data storage internal thereto. It is commonly known that a RAM has data input lines, data output lines, address lines and a write enable input signal. The data input and data output lines to the cache RAMs MEM0–MEM8 are shown by arrows that indicate the input or output direction; however, for clarity, the address lines and the write enable input signal lines to MEM0–MEM8 are not shown in FIG. 5. The processing unit 29 also includes the plurality of selectors S10–S28, S30–S34 and S56 for providing switching functions as required by this invention. The selectors S25–S28 are individually controlled by control lines (not shown) to pass either of the output of associated cache memories MEM5–MEM8 or the output of cross bar switch 50, to the input of a cross bar switch 51. The cross bar switch 51 also receives two input lines 52 and 53 directly from cross bar switch 50. The truth table processor 46, max value processor 47, and numeric processor 48 receive data from either the lines connected to the output of switch 51 or from the lines connected to selectors S20–S24.

In this invention, an important operational feature of one of the processing units 29A–29H is that truth table processor 46, max value processor 47, and numeric processor 48, via selectors S20–28, and switches 50 and 51, can receive data from two fundamental sources. First, data can be received from the output of barrel shifter 27 or delay lines DLL, DLA, DLB and DLR, or, in other words, data from external memory 23. Second, data can be received from cache RAMs MEM0–MEM8. Since selectors S20–S28 are each individually controlled by controller 30 in each processing unit 29, each processing unit 29 may receive at any clock cycle within one data burst, data from either of the two fundamental sources. Further, since barrel shifter 27 and delay lines DLL, DLA, DLB and DLR may allow data to be input in the form illustrated in row 61 shown in FIG. 6 (i.e., present data that is horizontally and vertically displaced in memory 23 to the processor in one clock cycle), it should be appreciated that the data from switch 50 or the data stored in MEM5–MEM8 may be a local neighborhood of data.

Cache Write

Data input to truth table processor 46, maximum value processor 47, and numeric processor 48 may therein be altered and transferred to selectors S30–S34, which select altered data from one of the processors 46, 47 and 48. Data selected by selectors S30–S34 are provided as inputs to cache RAMs MEM0–MEM4 via selectors S10–S14. The individual write enable signals (not shown) connected to cache RAMs MEM0–MEM4 will cause data values from selectors S30–S34 to be written to one or more of the memories MEM0–MEM4.

In contrast to selectors S20–S28, the selectors S10–S17 are collectively controlled by a common control line CTL3 to pass the output values of switch 50 to the inputs of cache RAMs MEM5–MEM8. A write enable signal (not shown) to one or more of these memories will cause data to be stored therein. The selectors S10–S17 can also be set by CTL3 to pass data values on the transpose-in bus 54 to the inputs of cache RAMs MEM0–MEM7. A write enable signal to all of these memories (not shown) will cause input data to be stored therein. The control signal CTL3 also controls a plurality of tristate gates T, the activation of the gates T by signal CTL3 allows the data from the output of selectors S20–S27 to be transmitted to the transpose-out bus 55, for a purpose that will be described below. The selector S56 is controlled by a control signal (not shown) to select and pass one of a plurality of inputs thereto to output line 57 wherein line 57 is connected to numeric processor 48 and tristate gate 58. A data output burst to external memory 23 is provided by setting control line CTL4 so that gate 58 passes the signal selected by selector S56 onto line 57 to external memory 23 via line 24C, wherein the data on line 24C is written into memory 23.

TRUTH TABLE PROCESSOR

Figure 7:
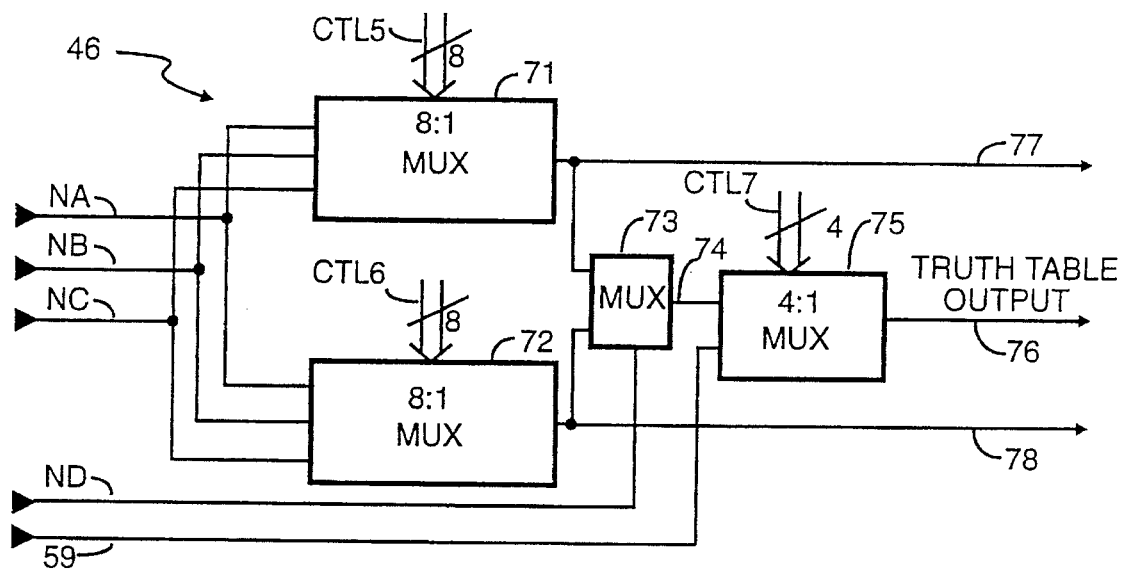
FIG. 7 is a partial schematic and block diagram of the truth table processor shown in FIG. 5.

Referring to FIG. 7, a detailed partial block diagram and schematic of truth table processor 46 is shown. Truth table operations, also known as Boolean operations or combinatorial logic operations, are provided that transform four input data arguments into a single output. The input data for processor 46 comprises lines NA, NB, NC and ND, selected by switch 51, and line 59, selected by the output of selector S28. The data values on lines NA, NB, NC and ND preferably correspond respectively to neighboring values, where one example was shown in FIG. 6 as A3, C1, C5 and E3. The data values on line 59 preferably correspond to the center value C3 in FIG. 6.

The truth table processor 46 includes multiplexers 71, 72 and 73, multiplexer connecting line 74, multiplexer 75, and output lines 76, 77 and 78. Three of the above-described lines of input data, NA, NB and NC, are input to multiplexers 71 and 72, and act as addresses to respectively select the value of one of the eight lines comprising control signal CTL5 and one of the eight lines comprising control signal CTL6 that are to be delivered to multiplexer 73. Multiplexer 73 selects one of these inputs according to the value on line ND.

Those skilled in the art will recognize that the arrangement of multiplexers 71, 72 and 73 forms a two-level multiplexer, with multiplexers 71 and 72 defining the first level, and multiplexer 73 defining the second level. The collective action of this two-level multiplexer is that of a "truth table" having sixteen possible states, one of which is selected as an output to line 74. The logic values of this truth table are derived from the states of control line input signals CTL5 and CTL6, each of which contain eight lines. The particular control line input which is chosen as the output in multiplexers 71 and 72 is determined by the state of the address inputs thereto (e.g., the states of NA, NB and NC). Lines 77 and 78 are respective outputs from multiplexer 71 and 72 and are therefore equivalent to two separate truth table outputs.

The data line 74, which is the output from multiplexer 73, and data line 59, provided as inputs to multiplexer 75 and act as a two-bit address to select one of the four control inputs comprising CTL7. The action of multiplexer 75 is to provide a further truth table function on the above-mentioned input data lines to processor 46. Since the inputs NA, NB, NC, ND and line 59 preferably correspond to a neighborhood of values, the multiplexer 75 acts as a further truth table transformation of the neighborhood of values.

In view of the capability of barrel shifter 27 and delay lines DLL, DLA, DLB, DLR to provide a data input of a local neighborhood of data in the form of row 61, as shown in FIG. 6, and since the addresses provided to the address inputs of multiplexer 71, 72 and 73 are derived from local neighborhood data signals transmitted from cache memories MEM5–MEM8 via selectors S25–S28 and cross bar switch 51, or from barrel shifter 27 via the delay lines, switch 50 and switch 51, it is apparent that the output of truth table processor 46 represents a general truth table transformation of the neighborhood of data values.

It should also be appreciated that the four cache memories MEM5–MEM8 are capable of storing arbitrary segments of matrix data retrieved from external memory 23. This transfer is accomplished by performing four separate operations wherein consecutive rows of data from four arbitrary locations in memory 23 are written to the four cache memories MEM5–MEM8. Data values from MEM5–MEM8 can be transmitted to inputs NA, NB, NC and ND via selectors S25–S28 and cross bar switch 51. Those skilled in the art will recognize that the collective action of the storage of data from arbitrary locations of the data matrix into the cache memories, and the two-level multiplexer, is that of a general truth table transformation of four arbitrary matrices of data values.

MAXIMUM VALUE PROCESSOR

Figure 8:
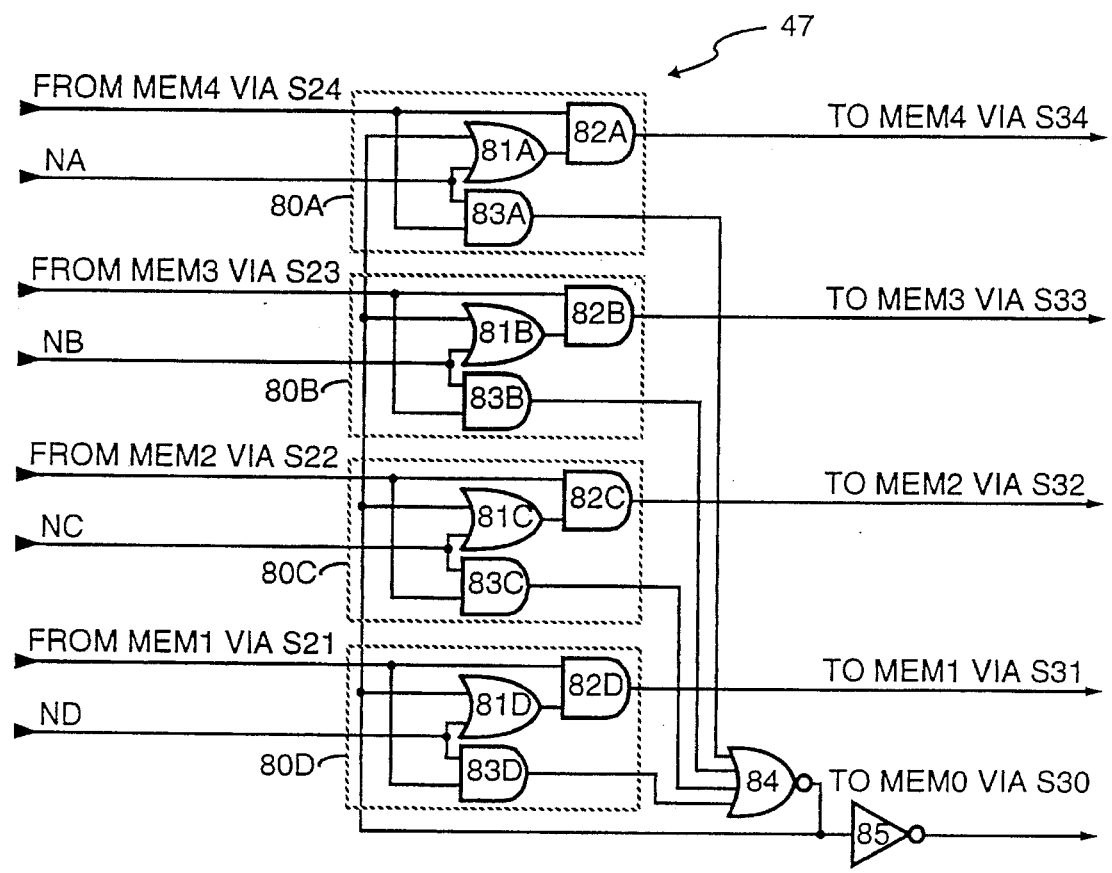
FIG. 8 is a partial schematic diagram of the maximum value processor shown in FIG. 5.

Referring to FIG. 8, a detailed partial schematic diagram of the maximum value processor is shown and is provided in processing unit 29 for computing the maximum value of a neighborhood in a data matrix. Initially, all values within memories MEM1–MEM4 are set to a logic 1. Each memory MEM1–MEM4 is respectively associated with one of the four neighborhood values provided on lines NA, NB, NC and ND via selectors S21–S24 and cross bar switch 51. The logic 1 within a memory MEM1–MEM4 represents the fact that the neighbor associated with that memory is potentially a maximum value. A logic 0 represents the fact that the associated neighbor is not a maximum value. Since all memories MEM1–MEM4 are initially set to logic 1, all neighbors are initially potentially a maximum value. The maximum value of a neighborhood of multi-bit words is found by bursting in the most significant bit (MSB) first and storing the MSB of the maximum value of that neighborhood. Successively lower significant bits are burst into the maximum value processor 47 and the bit value of the maximum value of the neighborhood is successively computed and stored in cache memory MEM0.

The following steps illustrate the method in detail. The MSB of the data matrix in memory 23 is burst into the processor 29. A neighborhood of most significant bit values is generated as signals NA–ND and are provided as inputs to maximum value processor 47. There are several different cases that may arise.

(Case 1): If the MSB of a neighbor, for example NA, is a logic 1, then NA is still potentially a maximum value regardless of the values of the MSB of the other neighbors. The output of OR gate 81A will be a logic 1. Since data in MEM4 is initially a logic 1, both inputs to AND gate 82A are a logic 1 which will be written back to MEM4, and thus still represent a potential maximum value. Gate 83A will output a logic 1 to NOR gate 84, which will in turn be forced to output a logic 0 no matter what the other input values are. The output of NOR gate 84 is inverted by inverter 85 and a logic 1 is written to MEM0, which represents the MSB of the maximum value for that neighborhood.

(Case 2): If the MSB of neighbor NA is a logic 1, and if the MSB of some other neighbor is a logic 0, for example, NB, then clearly NB does not represent a neighbor with a maximum value in view of the fact that the MSB of NA is a logic 1. In this case, since the output of NOR gate 84 is a logic 0 and NB is a logic 0, then the output of OR gate 81B is a logic 0, and thus the output of AND gate 82B is a logic 0. A logic 0 will then be written into MEM3. This signifies that NB is no longer a potential maximum value.

(Case 3): If the lines NA, NB, NC and ND are all a logic 0, then the outputs from all gates 83A–83D will be a logic 0, and the output of NOR gate 84 is a logic 1. The output of gate 84 is inverted by inverter 85 is a logic 0, and is written to MEM0. Also, since the output of NOR gate 84 is a logic 1, the outputs of all OR gates 81A–81D are a logic 1, and the values within MEM1–MEM4 will remain the same as they pass through AND gates 82A–82D.

At this stage in the processing, the data values stored in MEM0 represent the values of the MSB of the maximum value of the neighborhood for all data in a burst, and can be written into external memory 23. Now the second most significant bit (2ndMSB) of the data matrix is burst into the processor 29. A neighborhood of 2ndMSB values is generated as signals NA, NB, NC and ND, and are provided as inputs to maximum value processor 47. For the processing of the 2nd MSB, the description of the foregoing cases still apply, with one exception: if a value in one of the memories MEM1–MEM4 is a logic 0, then the corresponding neighbor NA, NB, NC and ND is not a potential maximum value and will be stricken from further consideration because the corresponding gate 83A–83D will output a logic 0 and not influence NOR gate 84. Furthermore, because of AND gates 82A–82D, a data value that is a logic 0 in MEM0–MEM4 will remain a logic 0. After processing of the 2ndMSB burst of the data matrix is complete, MEM0 contains the second most significant bit of the maximum value. The process is repeated in a like manner to compute the maximum value bit for the remaining bits of the data words comprising the data matrix.

In view of the foregoing, those skilled in the art will appreciate that the operation of the circuit herein described performs a method of computing the maximum value of a neighborhood of mult-bit words in a data matrix by providing the MSB of the neighborhood to processor 47, and continuing to provide, in decreasing order of significance, the remaining bits of each mult-bit word. The values within memories MEM1–MEM4 are flag bits which indicate that a neighboring point should be removed from consideration as being a maximum value. As more bits in each level of the words in the data matrix are burst into processor 47, more neighboring points are eliminated as being candidates for the maximum value. At each stage of reading significant bits, the value of the maximum value for that bit is known, although the actual neighbor that has the maximum value may not be known.

Numeric Processor

Figure 9:
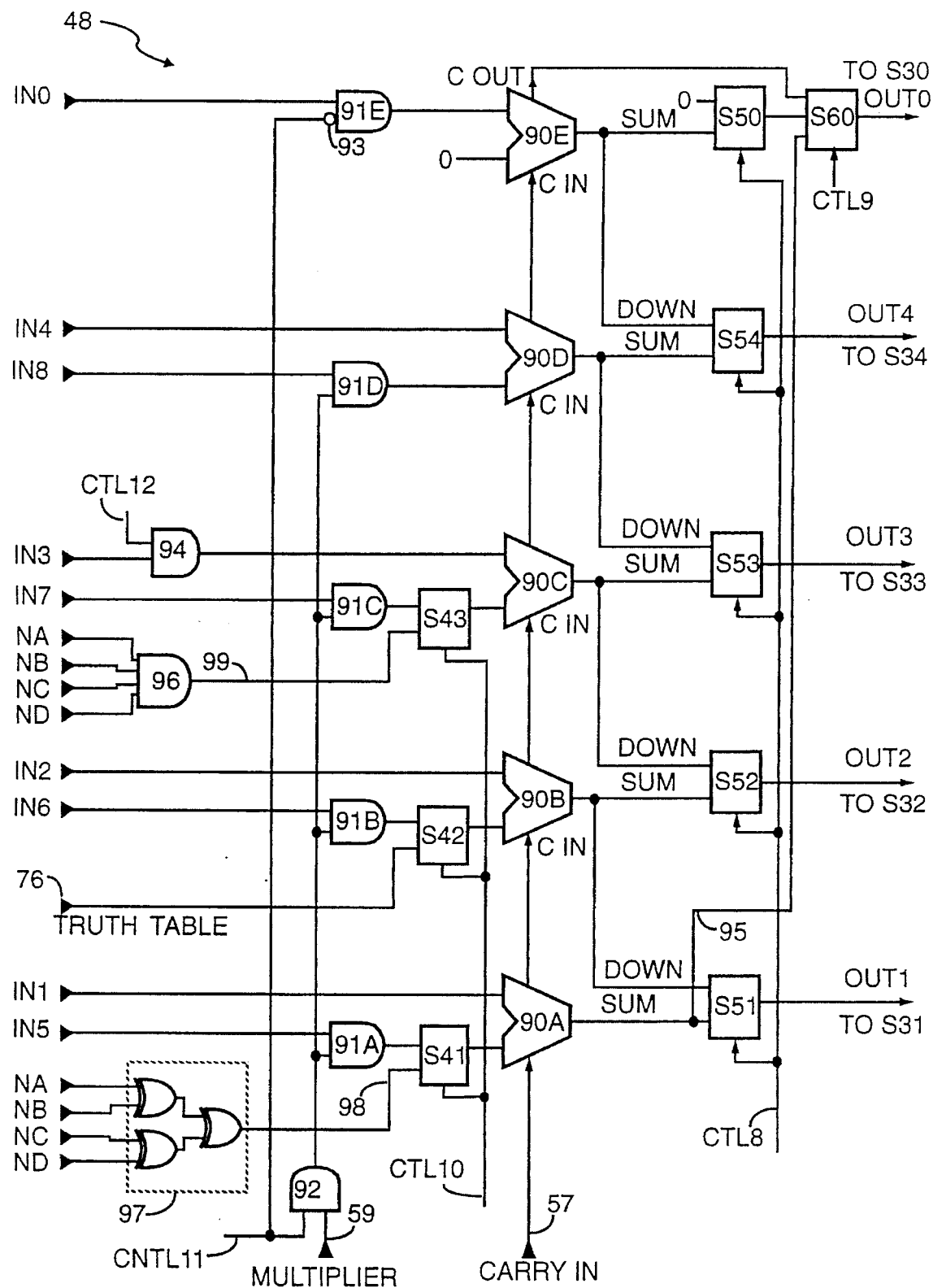
FIG. 9 is a partial schematic and block diagram of the numeric processor shown in FIG. 5.

Each processing unit 29A–29H includes a numeric processor 48, as shown in FIG. 9, for providing the capability of performing a number of types of arithmetic operations.

Data values are input at the left or bottom of FIG. 9 and are output at the right. Signal line reference indices prefixed by the letter IN are outputs from selectors S20–S28 in FIG. 5, which are connected to and associated with the data output of a respective cache memory MEM0–MEM8. For example, signal line IN0 is associated with MEM0, and signal line IN1 is associated with MEM1, and so forth. The inputs NA, NB, NC and ND are outputs of cross bar switch 51. The signal lines OUT0–OUT4 are connected to the inputs of selectors S30–S34 of FIG. 5, the respective outputs of which are connected to the data inputs of cache memories MEM0–MEM4 wherein signal line OUT0 is associated with MEM0, signal line OUT1 is associated with MEM1, and so forth. Adder units 90A–90D collectively act as a five bit adder with a first input word of five bits on lines IN1, IN2, IN3, IN4 and IN0, in order from the least significant bit to the most significant bit, respectively. A second input word of five bits appears on lines IN5, IN6, IN7, IN8, with a fifth bit always set to zero, in order from the least significant bit to the most significant bit, respectively. Collectively the lines OUT0–OUT4 act as an output word of five bits where the significance of the bits are controlled by selectors S50–S54 and S60, which are respectively controlled by lines CTL8 and CTL9.

There are three types of arithmetic operations provided by numeric processor 48: an increment operation, a multiply operation, and a neighborhood add operation. Details of these operations are described below.

Increment

For purposes of performing an increment operation, numeric processor 48 will have the following configuration. Selectors S41, S42 and S43 are set by control signal CTL10 to pass the outputs of AND gates 91A, 91B and 91C to adders 90A, 90B and 90C. The control signal CTL11 is set to a logic 0 so that AND gate 92 will cause a logic 0 to be passed to the lower input of the adders 90A–90D. Adder 90E is permanently provided with a logic 0 at its lower input. The control signal CTL11 will also cause AND gate 91E to pass signal IN0 to the upper input of adder 90E by virtue of the inverted input 93. The control signal CTL12 will also be set to a logic 1, thus causing AND gate 94 to pass signal IN3 to the upper input of adder 90C. The signals IN1, IN2 and IN4 are connected, respectively, to the upper inputs of adders 90A, 90B and 90D. In sum, the above configuration of control signals causes all lower inputs of the adders 90A–90E to be a logic 0 and the upper inputs of the adders 90A–90E to be connected to the output signals of cache memories MEM0–MEM4.

A sum, encoded collectively by the SUM outputs from the adders, will be the sum of the cache memory output signals and the carry-in value on line 57, which is set to a logic 1 for this operation to achieve the increment function. If control line CTL8 is set to pass the outputs labeled SUM from the adders 90A–90E, then lines OUT0-OUT4 will cause the sum to be written back to the cache memories MEM0–MEM4 in the same order as the inputs IN0–IN4. Those skilled in the art will recognize that in this case, the action of the numeric processor 48 is that of an incrementer that adds the value of the carry-in line 57 to the value encoded by the collective outputs of the cache memory outputs MEM0–MEM4.

Multiply

To perform the multiply operation, numeric processor 48 is configured as follows. The control line CTL11 is set to a logic 1 so that the output of AND gate 92 is a logic 1 when the input 59 is a logic 1. Further, selectors S41–S43 are set, via control to signal CTL10, pass the outputs of AND gates 91A, 91B and 91C. The input signals IN5, IN6, IN7 and IN8 are then transferred to the lower inputs of adders 90A–90D when the signal on line 59 is a logic 1; otherwise, the signal on the lower inputs of the adders is a logic 0. The control line CTL12 is set to a logic 1 such that AND gate 94 will pass the input signal IN3 to the upper input of adder 90C. The upper inputs of adders 90A–90D, respectively, receive input lines IN1–IN4. Further, the selectors S50–S54 are set via control signal CTL8 to pass the signals appearing at their DOWN inputs from adders 90A–90E; thus, the outputs from adders 90A–90D are effectively down shifted with respect to the input signals. Selector S60 is set to pass the least significant bit of the sum, which appears on the output of adder 90A and which is on line 95, to output line OUT0.

Those skilled in the art will recognize that in this configuration the action of numeric processor 48 is that of a bit-serial multiplier. The data values on input lines IN8–IN8 collectively act as the multiplicand, the bit on line 59 acts as a multiplier bit that conditionally adds the multiplicand to lines OUT0 to OUT4 which collectively act as the product accumulator. Furthermore, the product accumulator is down shifted so that the least significant bit of this add operation is stored in MEM0 via line OUT0, while the other bits are returned to the product accumulator, which corresponds to MEM1–MEM4, in the down shifted format. It should be appreciated that the down shifting action is equivalent to assigning subsequent multiplier bits on line 59 a higher power of two significance each time a new multiplier bit is transferred to line 59, and the system is clocked.

In practice a multiplication of multi-bit words stored in memory 23 is performed by this invention according to the following steps wherein rows of data are sequentially burst into or out from the processor chip 25.

(burst 1) The contents of the product accumulator, cache memory MEM0–MEM4, are set to zero.

(burst 2a) N rows of the least significant bit of the multiplicand are burst from memory 23 into MEM5.

(burst 2b,c) N rows of the next least significant bits of the multiplicand are burst from memory 23 into MEM6.

(burst 2d) The process is continued until N rows of the most significant bit are burst from memory 23 into MEM8. At the end of this first step MEM5–MEM8 collectively contain four bit words corresponding to the multiplicand.

(burst 3) N rows of the least significant bit of the multiplier are burst from external memory 23 to the multiplier input 59. As the least significant bits of the multiplier are sent, gates 91A–91D cause the multiplicand to be conditionally added to the product accumulator in MEM1–MEM4 when the corresponding multiplier bit is a logic 1. During the burst of the least significant bit of the multiplier, the outputs of the adders 90A–90D have the following interpretation. The product accumulation output OUT0–OUT4 consists of the contents of the previous product accumulation plus the multiplicand, where the new product is down shifted. The previous most significant bit in MEM4 is now occupied by the most significant carry out from adder 90E. The least significant bit of the product accumulation on line 95 is sent to MEM0 via S60.

(burst 4) Further product accumulations will not affect the least significant product accumulation bit in MEM0. Therefore MEM0 is burst out and stored in memory 23 via output selector S56 in FIG. 5. MEM0 is now free to store the contents of the next least significant bits of the product accumulation during the burst of further multiplier bits.

(burst N and burst N+1) Steps similar to (burst 3) followed by (burst 4) are repeated for all multiplier bits, where (burst N) is an input burst of the next significant multiplier bit and (burst N+1) is an output burst storing the next significant product accumulation bit.

(final burst) MEM1–MEM4 carry the four most significant bits during the product accumulation and are now sent to external memory 23 since the product accumulation is completed. Thus, these four most significant bits, along with the least significant bits previously written out from MEM0, collectively and wholly define the product of the multiplicand and multiplier.

Neighborhood Add

As described previously, cross bar switch 50 in conjunction with cross bar switch 51 select four neighborhood signals NA, NB, NC and ND. The purpose of the neighborhood add function of numeric processor 48 is to add the respective neighborhood values together. The addition of four neighbor bits is, at most, a three bit word. The most significant bit of the sum is a logic 1 only if all four neighbor bits are a logic 1. Therefore, numeric processor 48 includes an AND gate 96 that correctly computes the value of the most significant bit of the three-bit sum and outputs this result on line 99. The least significant bit is a logic 0 or 1 if the number of neighbor bits that are logic 1 are respectively even or odd. Accordingly, processor 48 includes three exclusive OR gates 97, connected as shown in FIG. 9, to compute the odd or even value of the input signals and outputs this value on line 98. The second least significant bit of the three-bit sum of four neighborhood bits is a logic 1 if and only if either two or three neighborhood bits are a logic 1. The computation of the second least significant bit is provided to numeric processor 48 by truth table processor 46 on line 76.

If the purpose of a neighbor add function is to add the values of one bit words to compute a three bit sum at each point in the data matrix, then the outputs lines 98, 76 and 99 already encode the correct result; however, if the purpose is to add the neighboring values of multi-bit words, then further bit-serial operations may employ the output lines 98, 76 and 99 for neighborhood add operations for multi-bit words.

As with previously-described operations, the control signals must be appropriately set to predetermined states. The control line CTL12 is set to a logic 0 so that the upper input of adder 90C is a logic 0. The control line CTL10 to selectors S41–S43 is set to the pass signals on line 98, truth table output line 76, and output line 99 to the respective lower inputs of adders 90A, 90B and 90C. The upper inputs of these adders are lines IN1, IN2 and IN3, respectively. The control line CTL8 is set to pass the DOWN outputs of the adders. The selector S60 is set to pass output line 95 to line OUT0. Adders 90D and 90E are not used.

In practice, a multi-bit neighborhood add is performed by this invention according to the following steps.

(burst 1) The contents of the sum accumulator in MEM0–MEM2 are set to zero.

(burst 2a) N rows of the least significant bits of the neighborhood are burst from external memory 23 into numeric processor 48 via lines NA, NB, NC and ND, which represent the data values for a neighborhood. Since MEM0–MEM2 are initially zero, IN0–IN2 are also zero and the upper inputs of adders 90A, 90B and 90C are zero. The three bit value of the neighborhood add is then transmitted unaltered via lines 98, 76 and 99 through the adders 90A–90C to output lines OUT0, OUT1 and OUT2, and are stored respectively in MEM0, MEM1 and MEM2.

(burst 2b) N rows of the next least significant bit of the neighborhood are burst into numeric processor 48. During this burst the outputs of the adders 90A–90C have the following interpretation: The sum accumulation output OUT0–OUT2 consists of the contents of the previous accumulation plus the neighbor sum on lines 98, 76 and 99. The new sum is down shifted. The previous most significant bit in MEM2 is now occupied by the most significant carry out from adder 90C. The least significant bit of the sum accumulation on line 95 is sent to MEM0 via OUT0 while the least significant bit previously stored in MEM0 is stored in MEMS.

(burst 2c) N rows of the third least significant bit of the neighborhood are burst into numeric processor 48. These bits are summed in a similar manner, the value of the sum being on lines 98, 76 and 99. The neighbor sums are accumulated using the adders, and sent to cache memory MEM0–MEM2 via output lines OUT0–OUT2 while storing the previous least significant in MEMS.

(burst 2d . . . ) The process is continued for all bits in the multi-bit words in the data matrix that are to be summed. The number of bits in the sum is limited only by the size of the cache memories, and by the number of rows in the data bursts.

Transpose Busses

Figure 10:
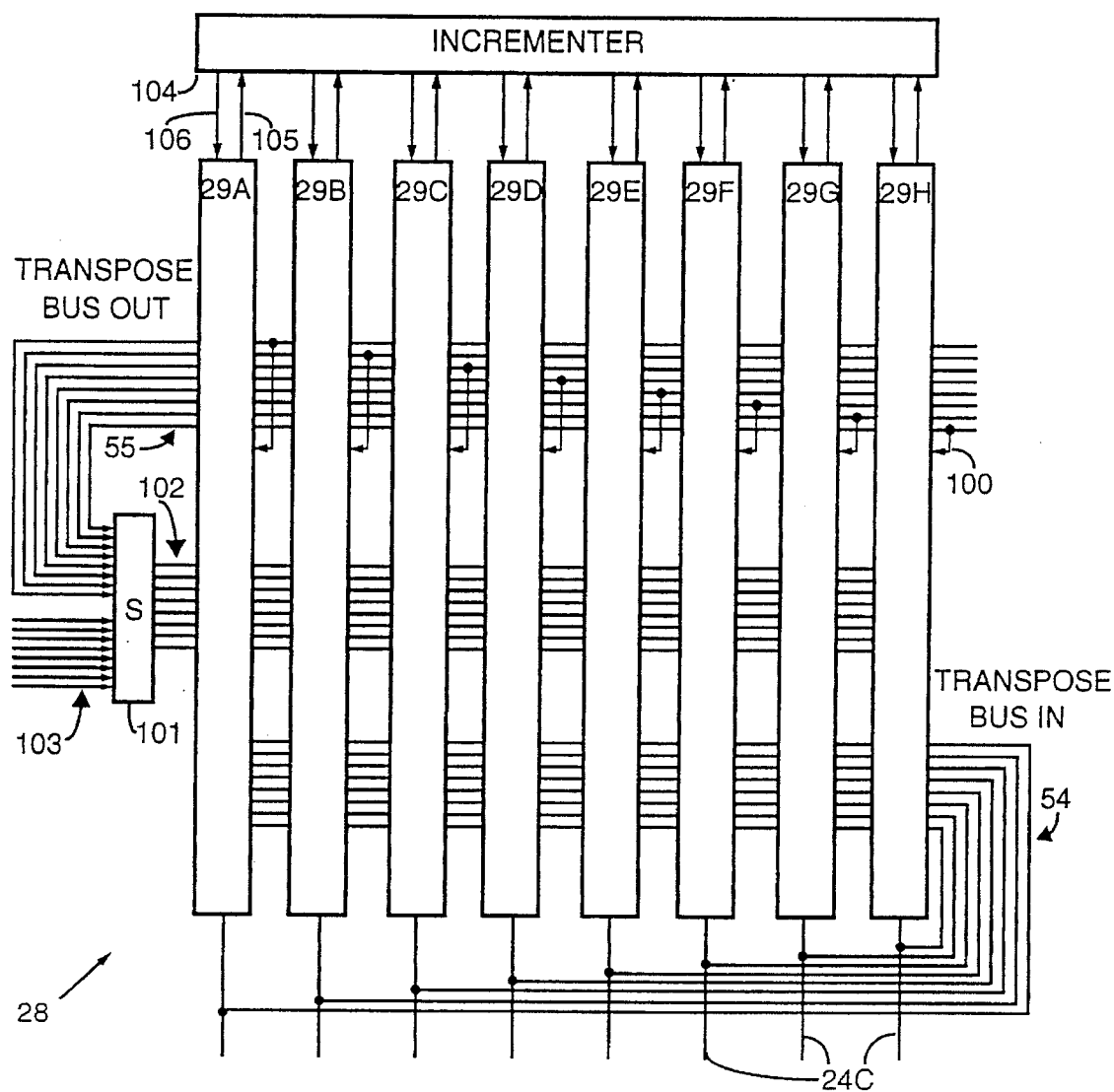
FIG. 10 is a partial schematic and block diagram of one of the blocks of processing units shown in FIG. 2.

Referring to FIG. 10, a single block 28 is shown illustrating that the eight processing units 29A–29H in each block 28 share a plurality of common busses. The eight transpose-bus-in lines 54 are each connected to a different memory input line 24C. The transpose-bus-in 54 is connected to selectors S10–S17 in FIG. 5. This transpose bus 54 operates selectively on a per block basis as follows. For any selected one of the processing units 29A–29H, a signal on control line CTL3 can cause data values on transpose-bus-in lines 54 to be passed to cache memories MEM0–MEM7, and stored within by memory rite enable signals (not shown) applied to each cache memory during the same clock cycle period. In any one block 28 only one control line CTL3 for a selected processing unit 29A–29H is active so that cache memories MEM0–MEM7 in only the selected one of the eight processing units 29A–29H store the contents of the transpose-bus-in 54. The contents of all cache memories in the seven other processing units 29A–29H in that block 28 are left undisturbed. Thus, for each block 28, one of the processing units 29A–29H may be selected such that the selected processing units cache may be written with the contents of bus 54.

As shown in FIG. 5, each of the eight transpose-bus-out lines 55 are connected via a respective line 100 to a respective output selector S56 in each of the processing units 29A–29H. Control line CTL3 in only a selected one of the eight processing units 29A–29H can be activated to cause the contents of the respective cache memories MEM0–MEM7 to be transferred to transpose-bus-out 55 via selectors S10–S17 and tristate gates T. If the respective output selector S56 in each of the processing units 29A–29H is controlled to pass the signals on lines 100 to the respective tristate gate 58 in each processing unit 29A–29H, and if the respective tristate gate is activated by control line CTL4, then the contents of the transpose-bus-out 55 will be transferred to lines 24C that are connected to external memory 23. The contents of transpose-bus-out 55 can be written into memory 23, if so instructed.

Referring to FIG. 10, an address on lines 103 is connected to selector 101, which is normally controlled to pass the values of the address respectively to an address bus 102 that is connected to the address lines of MEM8 for all the processing units 29A–29H in a block 28. Transpose-out-bus 55 is also connected to selector 101 and the values therein can be passed to address bus 102 to be broadcast to the MEM8s to serve as the address of MEM8 during one clock cycle. Since the data values on the transpose-bus-out 55 are from MEM0–MEM7 in one selected processing unit 29A–29H in one block 28, it should be appreciated that the values stored in MEM0–MEM7 of that selected processing unit can act as an address collectively to all memories MEM8 in the block 28. The following applications illustrate the utility of using the transpose bus as an address to cache memories MEMS.

Look-Up Table

A look-up table (LUT) is commonly used where each data element in a data array or matrix is to be transformed according to a very complex rule. Ordinarily it would be very time consuming to make a computation in accordance with such a rule for every element in a large data matrix. But if the computation was made once, off-line, for each possible data value of the combination of independent variables or inputs, and the results stored in memory, then the processor units only need to look up that value from the stored LUT array from each data point to be transformed. As an example of the foregoing technique, consider the following method. Assume eight bit look-up table values are stored in cache memory MEMS, where each bit of the LUT array is stored in the cache of a different processing unit 29A–29H in block 28. Further assume that an array of eight bit values that are to be transformed by the LUT are stored in a selected one of the processing units 29A–29H in each block 28, and that the selected processing unit is activated by control line CTL3 in FIG. 5 so that the values of MEM0–MEM7 of the selected processing unit are transferred to the transpose-bus-out 55 via selectors S20–S27 and tristate gates T. Selector 101 in FIG. 10 is set to transfer the values on the transfer-bus-out 55 to the address bus 102, thereby broadcasting the address to all the cache RAMs MEM8 in block 28. The cache memories MEM8 in the eight processing units 29A–29H will collectively read out the eight-bit LUT value stored therein and transfer that value to external memory 23 via selector S28, selector S56 and tristate gate 58. The LUT values and data values to be transformed are initially stored in external memory 23. The LUT values are transferred to MEM8 via memory lines 24C and cross bar switch 50. The data values to be transformed by the LUT are transferred from external memory 23 and stored in MEM0–MEM7 via lines 24C connected to transpose-bus-in 54 (shown in FIG. 10) through selectors S20–S27 (shown in FIG. 5). It should be understood that this operation can occur in all the blocks 28 of chip 25.

Histogram

A histogram is a count of the number of times that each possible value of a group of data values occur in an entire data array, and is another operation which can be advantageously implemented using the transpose bus features of this invention. A preferred technique for generating a histogram is as follows. The histogram values to be generated in MEM8 are initially set to zero. The eight MEM8 memories in the eight processing units 29A–29H collectively define an eight-bit word that is the histogram value. Eight-bit data values that are to be counted are stored in a selected one of the processing units 29A–29H in each block 28, and that selected processing unit is activated by control line CTL5 in FIG. 5 so that the values of MEM0–MEM7 within the selected processing unit are transferred to the transpose-bus-out 55 via selectors S20–S27 and tristate gates T. Selector 101 in FIG. 10 is set to transfer the values on the transfer-bus-out 55 to the address bus 102, thereby broadcasting the address to all the cache RAMs MEM8 in a block 23. The collective values on lines 105 that are output from all MEM8 in a block 28 at the address defined by the output values of MEM0–MEM7 are read out and transferred to incrementer 104 via lines 105. The value is incremented, sent back to MEM8 via line 106 and cross bar switch 50, and stored therein. The action described above causes an increment of the histogram value at some particular address every time a data value has that address, and thus generates a histogram. After all data values stored in MEM0–MEM7 are counted, more data values in external memory 23 may be loaded into MEM0–MEM7 wherein the histogram defined by the contents of MEM8 can be further updated until all values in the data matrix in memory 23 are counted. The histogram values in MEM8 are then transferred to external memory 23 via selectors S28, selectors 56 and tristate gate 58.

Processing Image Segments

In one embodiment of this invention, there is one processing unit for each column in an image. Thus each row corresponding to a data matrix, for example, an image matrix, can be completely read by the plurality of processing units as one memory reference in one clock cycle. In practice, however, image widths often exceed a practical limit in the number of processing units in a system. In that case, the image must be broken into two or more parts called vertical ribbons, and more than one memory reference is required to read a complete row of the image matrix data stored in the external memory. A difficulty overcome by this invention is how to relate data at the adjacent vertical edges of ribbons where neighborhood operations are performed, which must exchange data across ribbon boundaries.

Figure 11A:
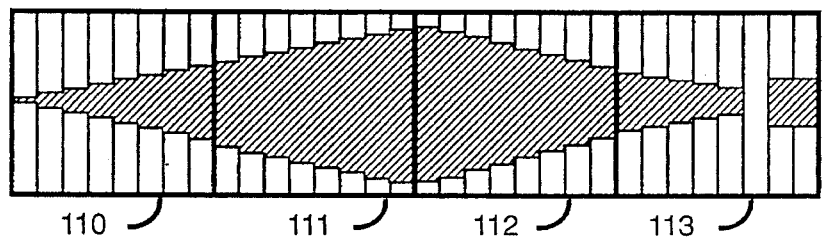
FIGS. 11A–11D depict signal flow for processing a data matrix stored in external memory having a width that is larger than the number of processing units in the system.

Referring to FIG. 11A, an image is shown with an example pattern indicated by the cross hatched region broken into four vertical sub-segments 110, 111, 112 and 113. Each sub-segment is capable of being stored in the memory 23 associated with one processing chip 25. As an example of a neighborhood function, suppose it is desired to add an image to itself displaced by two units. A processing system with at least four processing chips 25 and four associated memories 23 would be needed to hold the entire width of the image. In this case, the image need not be broken up into vertical ribbons, since the width of the image is equal to the number of processing units in the system.

Figure 11B:
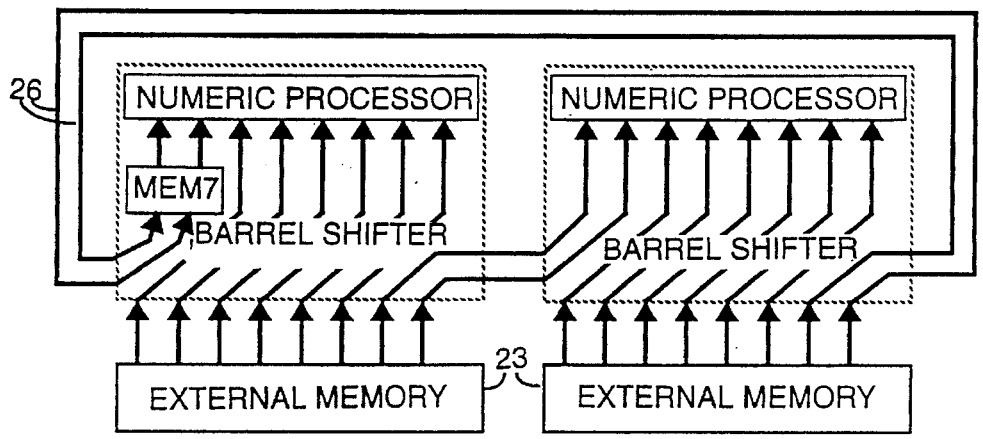

Referring to FIG. 11B, consider a system with only two processing chips 25. The diagram illustrates some aspects of the chip that are important to the neighborhood add function. The barrel shifter 27 is not shown, but for this example its effect is indicated by the arrows, whereby the data read from external memory 23 is shifted by two units before entering the processing units 29. Arrows also indicate the flow of data to an adjacent chip 25. The ring structure of the architecture is evident by the connections 26, from the right side of the right chip to the left side of the left chip. Only the two left-most cache memories MEM7, which are a portion of the full cache MEM0–MEM8, are represented. The following selectors shown in FIG. 5 are set specifically for this example. The selectors S27 associated with MEM7 in the two left-most processing units 29A and 29B are set to pass the output of the respective MEM7 to their respectively associated numeric processor 48. The selectors S17 associated with memories MEM7 are set to pass the output of cross bar switch 50 to the data input of the respective memory MEM7 for storage therein. The selectors corresponding to cache memories MEM7 for processing units 29C–29H are set to pass the output of cross bar switch 50 directly to numeric processor 48. Although the selectors are not shown in FIG. 11B for clarity, the resulting data flow is shown by the arrows wherein some data flows directly from the external memories 23 to numeric processor 48, and some data flows from external memories 23 to the input of MEM7, and from the output of MEM7 to numeric processor 48.

Figures 11C, 11D:
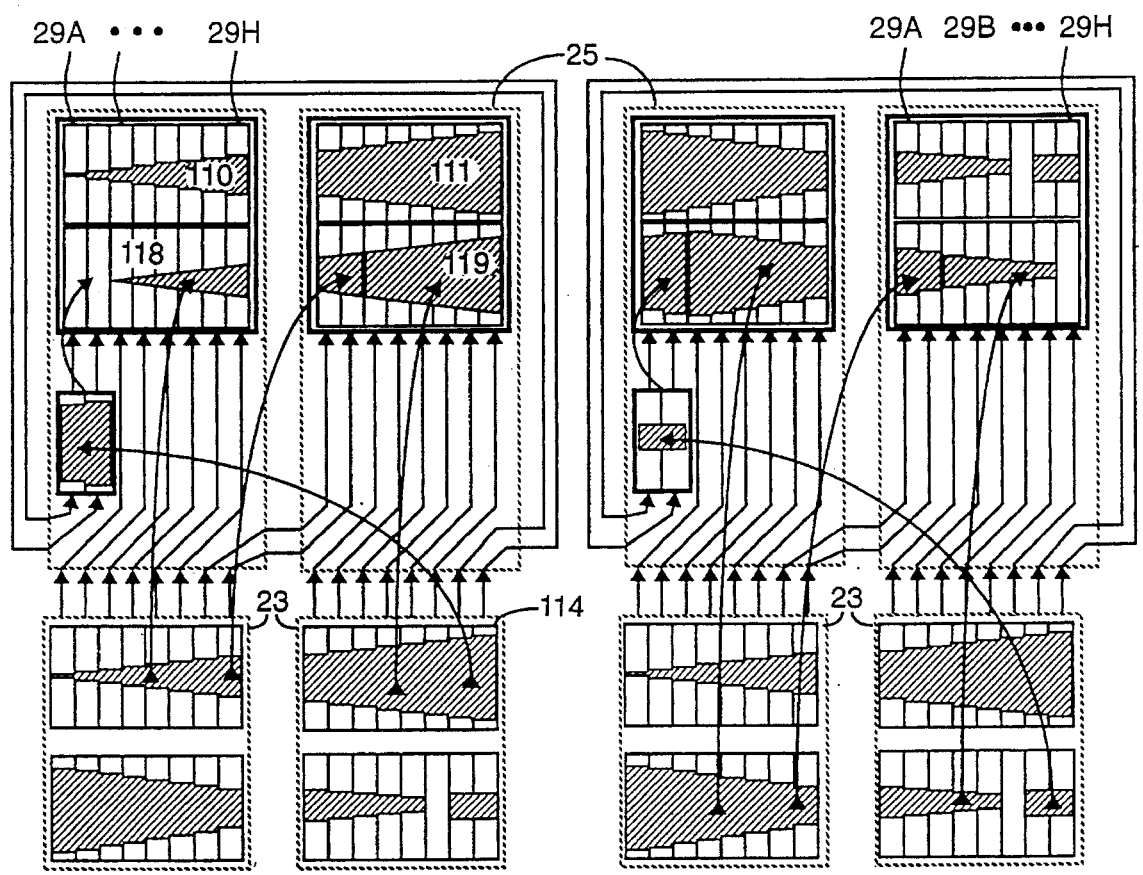

Referring to FIG. 11C, the image shown in FIG. 11A is shown partitioned in the external memory 23 for the two chips 25. Since the width of the image matrix is greater than the number of processing units, two segments or vertical ribbons in memory 23 are needed for complete storage; an upper segment of memory 23 stores image sub-segments 110 and 111, while a lower segment of memory 23 stores image sub-segments 112 and 113. A ribbon or segment boundary 114 is formed by the breaking up of the image of FIG. 11A into two vertical ribbons. Flow of rows of data into numeric processor 48 are indicated by the images themselves in FIGS. 11C and 11D. For example, in FIG. 11C, the sub-segments 110 and 111 represents the data unshifted by barrel shifter 27 while the sub-segments 118 and 119 represent the shifted data. The output of numeric processor 48 is not shown. Before the operation of adding an image to itself displaced by two units is performed, zeros are stored in MEM7. The process of relating data across boundary 114 comprises two phases. In the first phase of processing, the upper segment of the image in memories 23 are read into the two processing chips 25. The large curved arrows indicate the ultimate source and destination of the image sub-segments due to the settings of barrel shifter 27 and the selectors. The right-most portion of the image sub-segment is shifted to the cache memory MEM7 and stored therein during one clock cycle period. The zeros stored in cache memory MEM7 are read out to numeric processor 48. At the end of the first phase of processing, MEM7 contains the right-most portion of sub-segment 111.

Referring to FIG. 11D, the second phase of processing is shown where the lower segment of the image in memories 23 is read into the processing chips 25. Settings of the instructions to barrel shifter 27 and the selectors remain the same as in the first phase. The portion of the image that resides in MEM7 is read to numeric processor 48 along with the barrel shifted image simultaneously during the same cycle so that the processing units 29A–29H have access to both groups of data. The curved arrows indicate the data flow. The data that as stored in MEM7 during the first phase of processing was not needed during that phase of processing. Data selected for storage in the indicated cache memory during the first phase allows that data to be read and stored in the exact location where it will be needed for the second phase of the processing. The numeric processor 48 has access to image data on both sides of ribbon boundary 114, as indicated by the lower left sub-segment, particularly the data on both sides of the heavy line representing ribbon boundary 114, in FIG. 11D. Thus, the cache memories provide the needed temporary data storage to allow efficient relations across ribbon boundaries.

Those skilled in the art will recognize that data arrays of a width larger than that given in the above example are possible by dividing the array into a larger number of ribbons and applying the foregoing process as many times as needed. Although the foregoing example describes an addition operation of a data element and one right neighbor using storage provided by one cache memory, those skilled in the art will recognize that through the use of up to four cache memories storing data from bidirectional shift register 27, the above-described addition operation can be applied to a neighborhood of four data elements. Furthermore, the principle of the foregoing description of segmenting the data array into ribbons can also be applied to other neighborhood operations, such as the maximum value of data words over a neighborhood, or the logical AND of data bits over a neighborhood.

Controller

Figure 12:
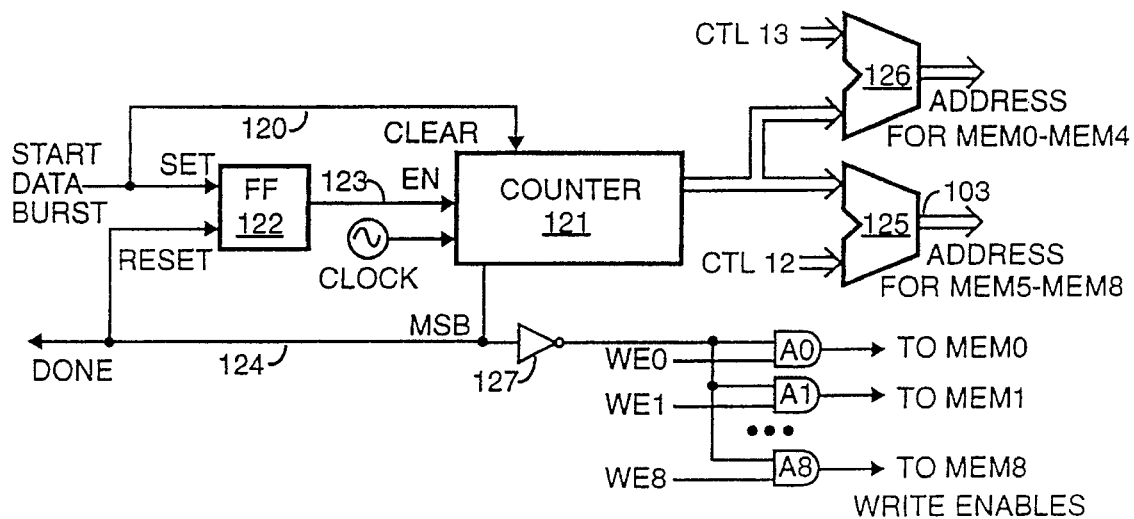
FIG. 12 is a partial schematic and block diagram of a data burst controller portion of the controller shown in FIG. 2.

Referring to FIG. 12, one portion of control section 30 of the processing chip 25 is shown which provides the means for reading or writing bursts of data from or to the cache memories MEM0–MEM8. This portion operates as follows. A logic 1 pulse on the start data burst signal input, which is an input that is preferably external to chip 25 and, for example, may be provided by host 21, will clear counter 121 and cause flip–flop 122 to set and output a logic 1 on line 123 to the enable input of counter 121. The logic 1 applied to counter 121 enable causes counter 121 to increment upon receipt of each pulse from an external clock. When the most significant bit (MSB) of counter 121 reaches a logic 1, flip-flop 122 is reset via line 124 and counter 121 stops incrementing. Preferably, counter 121 provides a 32 cycle count before resetting. The MSB of counter 121 is also a DONE signal signifying that counter 121 has stopped incrementing and may be provided to, for example, host 21. The value from the counter is connected to one input of an adder 125 that adds a word, which is constant for this data burst cycle, on lines CTL12 to the count. The word on lines CTL12 correspond to a starting address. The output on line 103 is sent to the address inputs of all cache memories MEMS–MEMS. Control lines CTL13 provides a word, which is constant for this data cycle, that is added to the output of counter 121 by adder 126, which then outputs an address for memories MEM0–MEM4. The data word on lines CTL13 correspond to another starting address. The outputs of AND gates A0–A8 furnish write enable signals to MEM0–MEM8. An inverter 127 causes a logic 1 to be sent to one input of each AND gate only while the counter is actively cycling through addresses. Logic 1 or 0 on the control lines WE0–WE8, which are lines similar to lines CTLX, control each cache memory separately so that only those selected will actually be written to. From the foregoing, it is apparent that the purpose of the controller section in FIG. 12 is to cause a burst of consecutive reads or writes, preferably 32 in number, from cache memory MEM0–MEM8 when activated by a start signal external to chip 25.

Figure 13:
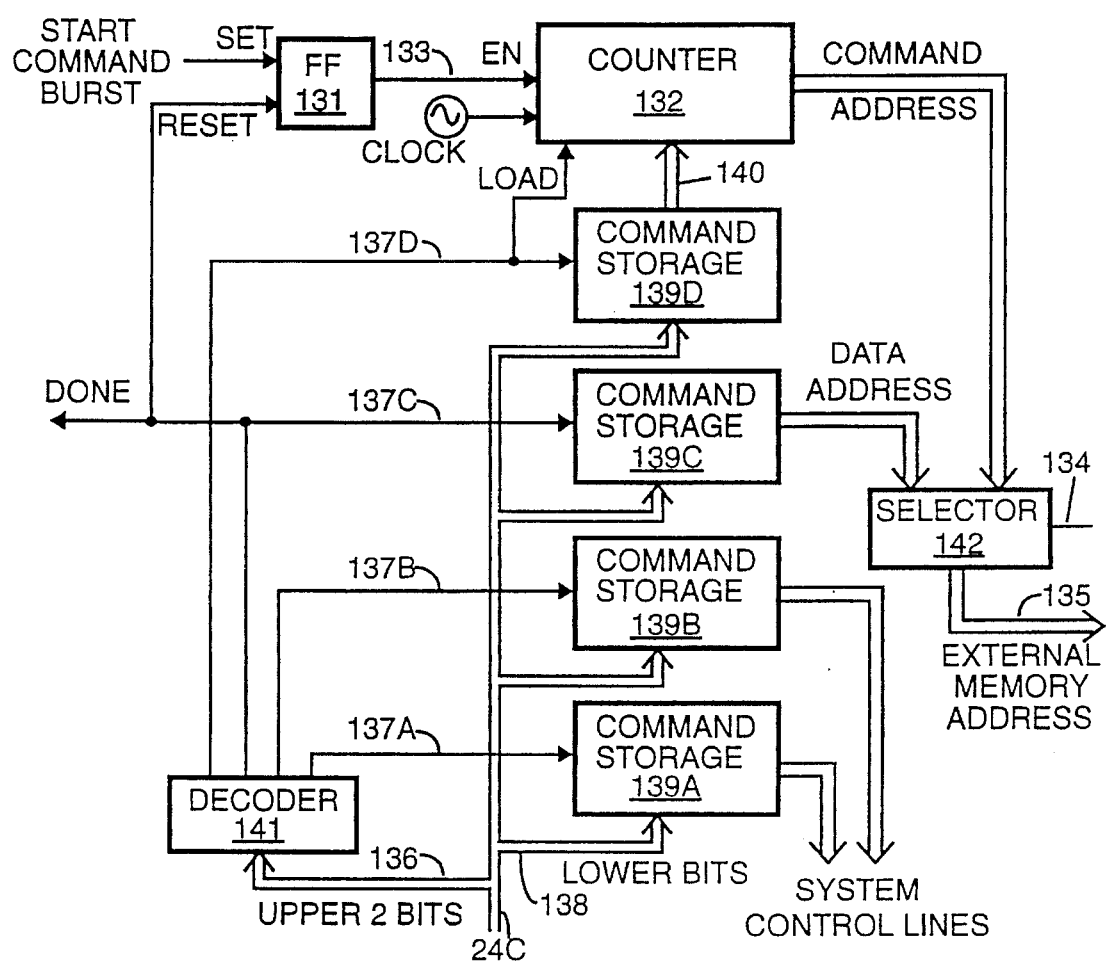
FIG. 13 is a partial schematic and block diagram of a command burst controller portion of the controller shown in FIG. 2.

Referring to FIG. 13, another portion of control section 30 of processing chip 25 is shown which provides the means for fetching and decoding bursts of instruction data from memory 23. This command burst portion includes a flip flop 131, a counter 132 connected to the flip flop 131 by line 133, control signal 134, external memory address 135, the upper two bits 136 of an instruction word, decoder output lines 137A–137D, lower or remaining bits 138 of an instruction word, a plurality of command storage registers 139A–139D, lines 140, decoder 141, and selector 142. A logic 1 pulse on the start command burst signal input, which is an input preferably external to chip 25, and may be provided by, for example, host 21, will cause flip-flop 131 to set and output a logic 1 on line 133 to the enable input of counter 132. Enabling counter 132 causes counter 132 to increment upon receipt of each pulse from the external clock. A control signal on line 134 to selector 142, which is external to chip 25 and may, for example, be coupled with host 21, will cause the value of the count from counter 132 to be sent to lines 135, which are the address inputs of external memory 23. This address is the location of a command in external memory 23 to be read in and stored in the processing chip 25. The value of said command is sent to one of the command storage registers 139A–139D via data output lines 24C from memory 23 and stored therein. Preferably, the upper two bits 136 of the word on lines 24C are decoded by the decoder 141 which activates one of the lines 137A–137D. The associated command storage register 139A–139D will store the data value represented by the lower bits 138 of the data word on lines 24C. Command storage registers 139A and 139B hold system control lines that are connected to the various selectors, truth table values, and other components where control lines are referenced. Command storage register 139C holds an address that may be selected by selector 142 to appear as external memory address 135 by external control signal 134. This data address is selected as the starting address of a data burst from external memory 23. Command storage register 139D holds a new command address that is loaded into the counter 132 via lines 140. The load is enabled by a decoded signal on line 137D when a lump to a new address is required. Decoded line 137C is also connected as a RESET to flip-flop 131. When a new data address command is loaded into command storage register 139C resulting from a decoded signal on line 137C, flip-flop 131 will reset, causing line 133 to return to a logic 0, and disable counter 132 from further counting. The burst of commands is thereby terminated. The signal on line 137C is also a DONE signal signaling that the last command has been loaded and may be provided to, for example, host 21. Host 21 can signal the controller to start a data burst using the circuit in FIG. 12.

An exemplary use of the command burst and data burst portions of controller 30 to burst data from a plurality of consecutive addresses of memory 23 will now be described. Both image data, and command or instruction data are stored in memory 23. The host 21 may set up processing chip 25 by selecting, via external control line 134 and selector 142, the command address from counter 132 to appear on external memory address lines 135, as shown in FIG. 13. The address on lines 135 is provided to external memory 23 to indicate the address where the next sequence of commands are stored. Next, host 21 initiates an instruction burst by providing a logic 1 pulse to the start command burst signal input, which causes counter 132 to increment with each received clock pulse. As each command is read in or fetched on lines 24C, it is partially decoded by decoder 141 and stored in one of the plurality of command registers 139A–139D. For example, some of the commands may be stored in registers 139A and 139B to set the system control lines. The last command of the sequence of commands typically performs two functions. First, it indicates to host 21 that the instruction burst is completed. Second, it sets the starting address for the data burst which is to follow via command storage register 139C, the data address lines and selector 142. Once host 21 receives the DONE signal on line 137C, the host 21 sets up processing chip 25 for the data burst by selecting, via external control line 134 and selector 142, the data address to appear on lines 135 provided to external memory 23, and which indicate the starting address of the data burst, as shown in FIG. 13. The host 21 next initiates the data burst by providing a logic 1 pulse to the start data burst signal input, shown in FIG. 12, which causes counter 132 to increment with each clock pulse. At this point, the control lines have already been set up in accordance with the decoded instructions to execute the plurality of operations that may be performed by the chip 25, and that have been described in detail above. Further, it should be understood that, preferably, only the starting address for this burst is provided by the circuit in FIG. 13 via storage register 139C and selector 142 to external memory 23. As discussed above, the cache burst RAM preferably used in this invention, (i.e., VRAM) includes a serial access memory (SAM) port wherein data stored may be read out by providing a starting address and a series of clock pulses. In this fashion, the memory bottleneck associated with providing a new memory address for each new memory reference (i.e., the bandwidth limitations of the address bus) is eliminated. Further, the consecutive addresses to cache memories MEM0–MEM8 via counter 121 and 125 and adders 125 and 126 are provided in synchronization with the address references to external memory 23, being related via the system clock. The data is burst in sequential row order, or, in other words, a row at a time, wherein each clock pulse to external memory 23 causes the next consecutive address (e.g., the next row of data in memory 23) to be referenced, the data stored therein being sent via lines 24C to, for example, the cache memories MEM5–MEMS, or to processors 46, 47, and 48 for processing during that clock cycle. Preferably, each data burst continues for 32 cycles, such that 32 rows of data from memory 23 are read into chip 25, although this number is not essential to the present invention.

It should be appreciated by those of ordinary skill in the art that since the instruction was set up prior to and was valid during the data burst, no additional instruction references are needed. Accordingly, there is no performance penalty for storing the data array, and the command data in the same memory, as in other SIMD architectures.

It is to be understood that the above description is merely exemplary rather than limiting in nature, the invention being limited only by the appended claims. Various modifications and changes may be made thereto by one of ordinary skill in the art which will embody the principles of the invention and fall within the spirit and scope thereof. For example, by means of a well known technique called a pipeline, the speed of a system can be increased. In the pipeline technique, there are a number of intermediate pipeline registers throughout the system that store intermediate results so that signals do not have to propagate all the way from the external memory through processing elements to the internal cache memory within one clock period. Signals need only propagate from one intermediate pipeline register to the next in one clock period. Further, it should be appreciated that this invention can be readily adapted to larger word sizes than the eight bits described herein by increasing the number of processing elements in a block and increasing the number of internal cache memories. Moreover, it should be appreciated that more sophisticated cache memories can be used that have simultaneous read and write ports, each with different read and write addresses and, as technology advances, the number of blocks of processing elements can increase.

I claim:

1. In a processing system for performing processing operations in parallel upon a data matrix stored in a memory means having L rows and M columns, where L and M are integers greater than one, the system including M processing units wherein each of the M processing units is associated with a respective column of the memory means, a method of transferring data between the memory means and the processing units, comprising the step of:

(A) shifting, in a first clock cycle, each bit of a first row of M data bits from the memory means one or more column positions to the processing unit associated with respectively adjacent columns of the memory means.

2. The method of claim 1, further comprising the step of:

(B) transferring, in the first clock cycle, each bit of the first row of M data bits to the respectively associated processing unit wherein horizontally displaced data values from the memory means are presented to each of the M processing units in the first clock cycle.

3. The method of claim 2 wherein step (A) further includes the step of delaying, respectively, each bit in the first row of M data bits shifted in step (A) by one or more clock cycles, and wherein step (B) further includes the step of delaying, respectively, each bit in the first row of M data bits transferred from the memory means by one or more clock cycles, wherein vertically displaced data values from the memory means are presented to each of the M processing units in one clock cycle.

4. In a processing system for performing processing operations in parallel upon data from an array of data stored in a first memory means having L rows and M columns, where L and M are integers greater than one, the system including an array of M processing units wherein each processing unit is associated with a respective plurality of second memory means, a method of transferring data between the first memory means and the processing units, comprising the steps of:

(A) bursting data in sequential row order from a first plurality of consecutive rows of the first memory means to a first one of the second memory means associated with each of the M processing units wherein the bursted data is stored in the first one of the second memory means; and (B) transferring array data stored in step (A) to the array of processing units, including bursting the array data stored in step (A) from each first one of the second memory means to the respective processing unit.

5. The method of claim 4 wherein step (A) includes the substeps of:

providing a starting address of the first plurality of consecutive rows to the first memory means;

providing plurality of clock pulses to the first memory means; and outputting from the first memory means the first plurality of consecutive rows of data, including outputting a further consecutive row, starting from a row having the starting address, for each provided clock pulse.

6. The method of claim 5 further including the step of bursting array data in sequential row order from a second plurality of consecutive rows of the first memory means to the array of M processing units, and wherein step (B) further includes the step of synchronizing the data being burst out from the first one of the second memory means with the array data from the second plurality of consecutive rows of the first memory means, and transferring the synchronized data to the array of M processing units.

7. The method of claim 4 further comprising the step of bursting data in sequential row order from a second plurality of consecutive rows of the first memory means to a respective second one of the second memory means associated with each of the M processing units wherein the bursted data is stored in the second one of the second memory means, and wherein step (B) further includes the step of bursting the data stored in the second one of the second memory means with the data being burst from the first one of the second memory means to the respective processing unit such that parallel streams of data are transferred to the respective processing unit.

8. The method of claim 7 wherein step (B) further includes the step of synchronizing the data being bursted out from the first and second ones of the second memory means with data in sequential row order being bursted out from a third plurality of consecutive rows of the first memory means, and transferring the synchronized data to the array of processing units.

9. The claim of method 8 wherein said second memory means comprises cache memory means.

10. In a processing system for performing processing operations in parallel upon a data matrix having P columns stored in a first memory means having L rows and M columns, where L, M and P are integers greater than one and P is greater than M, and wherein the data matrix is stored in the first memory means in a plurality of segments, the system including an array of M processing units wherein each of the M processing units is associated with a column of the first memory means, each processing unit has associated therewith a plurality of second memory means, a method of relating column data across segment boundaries, comprising the steps of:

(A) shifting the columns of a first segment at least one column position such that the column of data adjacent a first segment boundary is shifted across the first segment boundary;

(B) storing the column shifted across the first segment boundary in step (A) in a first one of the second memory means of the processing unit to which the shifted column of data is associated;

(C) shifting the columns of a second segment the same number of column positions as the first segment was shifted in step (A) such that the column of data adjacent the first segment boundary is shifted away from the first segment boundary;

(D) transferring the shifted second segment of column data to the M processing units; and (E) transferring the data stored in the first one of the second memory means in step (B) to the associated processing unit such that column data on both sides of the first segment boundary are accessible to the M processing units.

11. The method of claim 10 wherein steps (D) and (E) are performed simultaneously.

12. The method of claim 11 wherein the number of column positions shifted in step (A) is two, and wherein step (B) includes the further step of storing the two columns shifted across the first segment boundary in respective first ones of the second memory means of the processing unit to which the shifted columns of data are respectively associated, and wherein step (E) includes the further step of transferring the data stored in the respective first ones of the second memory means to the associated processing units, respectively.

13. The method of claim 12 wherein steps (A) and (B) are performed simultaneously during a first phase and steps (C), (D), and (E) are performed during a second phase.

14. The method of claim 13 wherein the second memory means comprises cache memory means.

15. In a processing system for performing processing operations in a parallel upon data stored in a first memory means having L rows and M blocks of N columns, where L, M, and N are integers greater than one, a method of transferring data between the first memory means and an array of M blocks of N processing units, wherein each of the M×N processing units are associated with a respective one of the M×N columns of the first memory means, comprising the steps of:

(A) selecting, for at least certain of the M blocks, one of the N processing units for receiving data;

(B) transferring, for blocks having selected processing units, from the first memory means a row of N data bits directly to the selected one processing unit; and (C) storing, for the blocks having selected processing units, each respective row of N data bits transferred in step (B) in the respective processing unit selected in step (A).

16. The method of claim 15 wherein each of the M×N processing units is associated with at least N second memory means, and wherein step (A) includes the substep of generating, for each processing unit selected in step (A), a control signal for enabling the second memory means associated with each selected processing unit to receive a respective N bit row of data, and wherein step (C) includes the substep of storing, for each enabled group of N second memory means, the respective row of N data bits therein.

17. The method of claim 16 wherein the generating and storing substeps are performed in one clock cycle period.

18. In a processing system for performing processing operations in parallel upon data stored in a first memory means having L rows and M blocks of N columns, where L, M, and N are integers greater than one, a method of transferring data between the first memory means and an array of M blocks of N processing units, wherein each of the M×N processing units are associated with a respective one of the M×N columns of the first memory means, and wherein each of the M×N processing units is associated with at least N second memory means, comprising the steps of (A) selecting, for at least certain of the M blocks, one of the N processing units for outputting data; and (B) transferring, for the blocks having selected processing units, from each selected processing unit, a group of N data bits stored in the N second memory means associated with each selected processing unit to the first memory means and therein storing each transferred group of N data bits.

19. In a parallel processing system having M blocks of N processing units, where M and N are integers greater than 1, each processing unit being associated with a plurality of memory means contained therein, a method of retrieving data using indirect addressing comprising the steps of:

(A) selecting, for each of the M blocks, one of the N processing units;

(B) reading, for each of the M blocks, a respective indirect address from a first group of the plurality of memory means associated with each processing unit selected in step (A);

(C) broadcasting, for each of the M blocks, the respective indirect address read in step (B) to a second group to serve as the address of the second group, of the memory means in each of the N processing units of the respective block;

(D) outputting, for each of the M blocks, the data stored at the respective indirect address of the second group of the memory means in each of the N processing units, the collective output defining a respective data word.

20. The method of claim 19 wherein the first group of the memory means is a 1×N array of cache memory means, and the second group of the memory means is a single cache memory means.

21. The method of claim 19 wherein steps (B), (C), and (D) are performed simultaneously.

22. The method of claim 20 wherein steps (B), (C), and (D) are performed simultaneously.

23. The method of claim 19 wherein steps (B), (C) and (D) are repeated a predetermined number of times to output a plurality of data words and wherein step (B) is performed by the substeps of providing a starting address to the first group of the memory means to read the indirect address, and successively incrementing, for each of the predetermined iterations of steps (C) and (D), the starting address to read another respective indirect address stored in consecutively addressed locations of said first group of memory means wherein another data word is outputted.

24. In a processing system for performing operations in parallel, the system including an array of M×N processing units where M and N are integers greater than 1, a memory means, and a controlling means, a method of transferring instruction data and matrix data from the memory means to the array of M×N processing units, comprising the steps of:

(A) transferring instruction data stored in the memory means to a controlling means;

(B) decoding the instruction data transferred in step (A) with the controlling means to condition the M×N processing units to receive and process matrix data; and (C) transferring matrix data from the memory means while the M×N processing units remain conditioned from step (B).

25. The method of claim 24 wherein the memory means has a plurality of rows and M blocks of N columns, each of the M×N processing units being associated with a respective one of the M X N columns of memory means, certain of the M×N bit rows of the memory means collectively defining instruction data, and wherein step (A) includes the substep of transferring a plurality of M×N bit rows of instruction data from the memory means to the controlling means.

26. The method of claim 24 wherein the memory means has a plurality of rows and M blocks of N columns, each of the M×N processing units being associated with a respective one of the M×N coles of memory means, certain of the M×N bit rows of the memory means collectively defining instruction data and wherein step (B) includes the substeps of routing, according to at least the uppermost two bits of an M×N bit instruction, the remaining bits of that instruction to a storage register, generating, using the remaining bits stored in the storage register, a plurality of control signals, and transferring the plurality of control signals to the M×N processing units to condition the processing units for receiving and processing matrix data.

27. The method of claim 24 wherein the memory means has a plurality of rows and M blocks of N columns, each of the M×N processing units being associated with a respective one of the M×N columns of memory means, and wherein step (C) includes the substeps of providing a starting address of a first plurality of consecutive rows to the memory means, providing a plurality of clock pulses to the memory means, and outputting the first plurality of consecutive rows of matrix data in sequential row order, said outputting substep including outputting a further consecutive row, starting from a row having the starting address, for each provided clock pulse.

28. An apparatus for transferring data comprising:
memory means having L rows and M columns, where L and M are greater than 1, for storing a data matrix;
an array of M processing units, each of said processing units being respectively associated with one of the M columns of said memory means for performing operations in parallel upon said data matrix;
shifting means coupled to said memory means and with said array of M processing units for shifting, in a first clock cycle, each bit of a first row of M bits of matrix data from the M columns of memory means one or more column positions to one of M processing units associated with respectively adjacent columns of said memory means.

29. The apparatus of claim 28, further comprising:
means coupling each of said M processing units with the respectively associated column of said memory means for transferring, in said first clock cycle, each bit of said first row of M bits of matrix data from the M columns of memory means to the respectively associated one of M processing units wherein horizontally displaced data values from said memory means are presented to each of said M processing units in said first clock cycle.

30. The apparatus of claim 29 wherein each one of said M processing units includes delay means for delaying, respectively, each shifted bit in said first row of M data bits shifted by said shifting means by one or more clock cycles, and for delaying, respectively, each bit in said first row of M data bits transferred by said means for transferring by one or more clock cycles, wherein vertically displaced matrix data from said memory means are presented to each of said M processing units in one clock cycle.

31. The apparatus of claim 30 wherein said shifting means includes a barrel shifter.

32. The apparatus of claim 31 wherein said delaying means includes a digital delay line.

33. In a parallel processing system, an apparatus for transferring data, comprising:
a first memory means having L rows and M columns, where L and M are integers greater than 1, for storing an array of data;
an array of M processing units, each of said processing units being respectively associated with one of said M columns of said first memory means for performing operations in parallel upon said array of data, each of said processing units being associated with a plurality of second memory means;
first bursting means coupled to said M columns of first memory means and to said second memory means for bursting array data in sequential row order from a first plurality of consecutive rows of said first memory means to a first one of said second memory means for each of said M processing units and for storing said burst array data in said respective first one of said second memory means; and
means coupled with said second memory means and said M processing units for transferring stored array data from the respective first one of said second memory means to each one of said M processing units, said means for transferring including second bursting means for bursting said stored array data from each first one of said second memory means to the respectively associated one of said array of M processing units.

34. The apparatus of claim 33 wherein said first bursting means includes a controller means having a means for providing a starting address of said first plurality of consecutive rows to said first memory means, and a means for providing clock pulses the said first memory means, wherein said first memory means, upon being provided a further clock pulse, outputs a further consecutive row, starting from a row having the starting address.

35. The apparatus of claim 34 further comprising a third bursting means coupled with said M columns of first memory means and coupled with said array of M processing units for bursting array data in sequential row order from a second plurality of consecutive rows of said first memory means to said array of M processing units; and
synchronizing means coupled with said first memory means and said second memory means for synchronizing said burst array data from each first one of said second memory means and said burst array data from said second plurality of consecutive rows of said first memory means, wherein said synchronized array data is transferred to said array of M processing units.

36. The apparatus of claim 33 wherein said first bursting means is operative to burst array data in sequential row order from a second plurality of consecutive rows of said first memory means to a second one of said second memory means for each of said M processing units, said first bursting means being further operative to store said bursted array data from said second plurality of consecutive rows in said respective second ones of said second memory means, and
wherein said second bursting means bursts said array data stored in respective second ones of said second memory means with said array data stored in respective first ones of said second memory means to the respective one of said M processing units such that parallel streams of data are transferred to each processing unit.

37. The apparatus of claim 36 wherein said third bursting means is operative to burst array data in sequential row order from a third plurality of consecutive rows of said first memory means to said M processing units in synchronization with said array of data stored in respective first and second ones of said second memory means of each of the M processing units.

38. The apparatus of claim 37 wherein said second memory means includes a plurality of cache memory means.

39. The apparatus of claim 35 wherein said first bursting means further includes a switch means connected to said first memory means for routing array data, a plurality of first selector means connected between said switch means and said second memory means, said first selector means being responsive to a first control signal for selectively passing burst array data from said switch means to said second memory means, and said controller means further having a means coupled to said first selector means for generating said first control signal.

40. The apparatus of claim 39 wherein said switch means includes a cross bar switch.

41. The apparatus of claim 40 wherein said second bursting means includes a plurality of second selector means coupled to said second memory means and said array of M processing units, said plurality of second selector means being responsive to a respective one of a plurality of second control signals for selectively passing array data stored in said second memory means to said M processing units, and said controller means further having a means coupled with said second plurality of second selector means for generating said plurality of second control signals.

42. The apparatus of claim 41 wherein said third bursting means includes said cross bar switch connected with said first memory means for routing array data from said first memory means, and further includes said plurality of second selectors.

43. The apparatus of claim 42 wherein said synchronization means includes said means for providing clock pulses.

44. The apparatus of claim 33, wherein each of said M processing units includes a numeric processor.

45. In a parallel processing system, an apparatus for relating column data across a segment boundary, comprising:

first memory means having L rows and M columns, where L and M are integers greater than 1, for storing a data matrix having P columns, where P is an integer greater than M, and wherein said data matrix is stored in said first memory means in a plurality of segments;

an array of M processing units for performing operations in parallel upon said data matrix, each of said processing units being respectively associated with one of said M columns of said first memory means, each of said processing units being associated with a plurality of second memory means;

shifting means coupled with said first memory means, said second memory means and said array of M processing units for shifting the columns of a first segment at least one column position such that a column of data adjacent a first segment boundary is shifted across said first segment boundary, wherein said shifted first segment of column data is stored in a first one of said second memory means of a processing unit to which said shifted column of data is associated, said shifting means being operative to shift the columns of a second segment the same number of column positions as said first segment was shifted such that a column of second segment data adjacent said first segment boundary is shifted away from said first segment boundary;

first transferring means coupled with said shifting means and said array of M processing units for transferring said shifted second segment of column data to said M processing units; and second transferring means coupled with said first one of said second memory means and said processing unit associated therewith for transferring said shifted matrix data stored in said first one of said second memory means to said processing unit associated therewith wherein column data on both sides of said first segment boundary are accessible to said M processing units.

46. The apparatus of claim 45 wherein said first and second transferring means transfer, respectively, said shifted second segment of column data and said shifted data stored in said first one of said second memory means, to said M processing units simultaneously.

47. The apparatus of claim 46 wherein the number of column positions shifted by said shifting means is two such that two columns of said first segment are shifted across said first segment boundary, said two coles being stored in respective first ones of said second memory means of the processing units to which said two shifted coles of data are respectively associated, said second transferring means being operable to transfer data stored in said respective first ones of said second memory means to the associated processing units, respectively.

48. The apparatus of claim 47 wherein said shifting means shifts said first segment, and said column shifted across said first segment boundary is stored simultaneously during a first phase, wherein said shifting means shifts said second segment, and said first and second transferring means respectively transfers said shifted second segment of column data and said shifted data stored in said first one of said second memory during a second phase.

49. In a parallel processing system, an apparatus for transferring data, comprising:

a first memory means having L rows and M×N columns, where L, M, and N are integers greater than 1, for storing a data array;

an array of M blocks of N processing units for performing operations in parallel upon said array of data, each of said M×N processing units being associated with a respective one of said M×N columns of said memory means;

selecting means coupled with said M×N processing units for selecting, for at least certain of said M blocks, one of said N processing units for receiving data;

transposing means coupled with said first memory and each one of said M×N processing units for transferring, for blocks having selected processing units, from said first memory means a row of N data bits to a respective block of N processing units wherein each transferred row is stored in said respective one processing unit selected by said selecting means.

50. The apparatus of claim 49 wherein each of said M×N processing units is associated with at least N second memory means, and said apparatus further including a controller means, coupled with each of the M×N processing units for generating, for selected processing units a control signal for enabling said second memory means associated with each selected processing unit to receive a respective N bit row of data wherein each row of N data bits is stored in the respective group of N second memory means enabled by said controller means.

51. The apparatus of claim 50 wherein said controller means generates said control signal and said rows of N data bits are stored in said enabled groups of N second memory means in one clock cycle period.

52. The apparatus of claim 51 wherein said selecting means includes a plurality of selectors, and wherein said transposing means includes, for each of said M blocks, a transpose-in bus.

53. In a parallel processing system, an apparatus for transferring, comprising:

a first memory means having L rows and M×N columns, where L, M, and N are integers greater than 1, for storing a data array;

an array of M blocks of N processing units for performing operations in parallel upon said data array, each of said M×N processing units being associated with a respective one of said M×N columns of said first memory means, each of said M×N processing units being associated with at least N second memory means;

selecting means coupled with, for each of the M×N processing units, said N second memory means for selecting, for at least certain of said M blocks, one of said N processing units for outputting data; and transposing means coupled with said selecting means and said first memory means for transposing and transferring a group of N data bits stored in said N second memory means associated with each selected processing unit to said first memory means and for storing each transferred group of N data bits.

54. In a parallel processing system, an apparatus for retrieving data using indirect addressing, comprising:

an array of M blocks of N processing units for performing operations in parallel, each of said M×N processing units being associated with a plurality of memory means contained therein;

selecting means coupled with said plurality of memory means for selecting, for each of said M blocks, one of N processing units and for reading a respective indirect address from a first group of said plurality of memory means associated with each selected processing unit; and broadcasting means responsive to said respective indirect address for broadcasting, for each of the M blocks, said respective indirect address to a respective second group of said plurality of memory means in each of N processing units of the respective block, wherein each block outputs data stored at said respective indirect address of said second group of said plurality of memory means in each of the N processing units, the collective output of N second groups for each block defining a respective data word, whereby said respective data word is retrieved as the collective output from said second group in each processing unit using an indirect address stored in said first group.

55. The apparatus of claim 54 wherein said first group of memory means is a 1×N array of cache memory means, and said second group of memory means is a single cache memory means.

56. The apparatus of claim 54 wherein said selecting means selects processing units and reads indirect addresses, and said broadcasting means broadcasts said indirect addresses to output said data word in one clock cycle period.

57. The apparatus of claim 55 wherein said selecting means selects processing units and reads indirect addresses, and said broadcasting means broadcasts said indirect addresses to output said data word in one clock cycle period.

58. The apparatus of claim 54 wherein said selecting means, for each of said M blocks, reads another respective indirect address from said first group of memory means a predetermined number of times to output a plurality of data words, and wherein said apparatus further includes a means for providing a starting address to said first group to read said respective indirect address, and for successively incrementing said starting address, for each indirect address; and wherein said selecting means reads another respective indirect address in response to said incremented starting address such that another data word is outputted by each block.

59. In a parallel processing system, an apparatus for transferring instructions and matrix data from a memory means, comprising:

a memory means;

an array of M blocks of N processing units coupled with said memory means for performing operations in parallel on matrix data according to instructions, wherein said matrix data and said instructions are stored in said memory means; and a controller means coupled with said memory means and said array of processing units for fetching instructions from said memory means and for decoding said fetched instructions to condition said array of M×N processing units to receive and process matrix data, wherein at least one instruction is fetched and decoded by said controller means, said controller means including data burst means coupled with said memory means for transferring matrix data from said memory means while said M×N processing units remain conditioned in accordance with said instruction fetched and decoded by said controller means.

60. The apparatus of claim 59 wherein said memory means has a plurality of rows and M blocks of N columns, each one of said array of M×N processing units being associated with a respective one of said M×N columns of memory means, wherein certain of said M×N bit rows of said memory means collectively define respective instructions, wherein said controller means fetches a plurality of M×N bit consecutive rows of instructions from said memory means.

61. The apparatus of claim 59 wherein said memory means has a plurality of rows and M blocks of N columns, each one of said array of M×N processing units being associated with a respective one of said M×N columns of memory means, wherein certain of said M×N bit rows of said memory means collectively defining respective instructions, said controller means including a storage register and routing means responsive to said fetched instruction for routing, according to at least the uppermost two bits of said fetched instruction, the remaining bits of said fetched instruction being routed to said storage register, said controller means further including control signal generating means for generating, using the remaining bits stored in said storage register, a plurality of control signals to condition said M×N processing units for receiving and processing matrix data.

62. The apparatus of claim 59 wherein said memory means has a plurality of rows and M blocks of N columns, each one of said array of M×N processing units being associated with a respective one of said M×N columns of memory means, wherein said data burst means includes means for providing a starting address of a first plurality of consecutive rows of said memory means, means for providing a plurality of clock pulses to said memory means, wherein said first plurality of consecutive rows of matrix data are outputted in sequential row order starting from one of said rows having said starting address when said starting address is provided and, wherein a further consecutive row is outputted for each further provided clock pulse.

\* \* \* \* \*

UNITED STATES PATENT AND TRADEMARK OFFICE
CERTIFICATE OF CORRECTION

PATENT NO. : 5,557,734
DATED : September 17, 1996
INVENTOR(S) : Stephen S. Wilson It is certified that error appears in the above-indentified patent and that said Letters Patent is hereby corrected as shown below:

Column 30, line 50 change word "coles" to --columns--.

Column 33, line 56 change word "coles" to --columns--.

Column 33, line 58 change word "coles" to --columns--.

Signed and Sealed this

Fourth Day of February, 1997

BRUCE LEHMAN

*Attest:*

*Attesting Officer*        *Commissioner of Patents and Trademarks*

UNITED STATES PATENT AND TRADEMARK OFFICE
CERTIFICATE OF CORRECTION

PATENT NO. : 5,557,734
DATED : Sep. 17, 1996
INVENTOR(S) : Wilson

It is certified that error appears in the above-indentified patent and that said Letters Patent is hereby corrected as shown below:

```
Column 4, line 17, "coles" should be --columns--.
Column 5, line 28, "Joined" should be --joined--.
Column 8, line 12, "a" should be deleted.
Column 8, line 15 "6" should be --26--.
Column 8, line 18 "5" should be --25--.
Column 9, line 43 "coles" should be --columns--.
Column 12, line 12 "Gross Bar Switch" should be--Cross Bar Switch--.
Column 12, line 16 "unit 9" should be --unit 29--.
Column 12, line 21 "GTL2" should be --CTL2--.
Column 18, line 20 "IN8-IN8" should be --IN5-IN8--.
Column 20, line 15 "MEMS" should be --MEM8--.
Column 20, line 22 "MEMS" should be --MEM8--.
Column 20, line 42 "rite" should be --write--.
Column 21, line 34 "MEMS" should be --MEM8--.
Column 22, line 6 "CTLS" should be --CTL3--.
Column 24, line 42 "MEMS-MEMS" should be --MEM5-MEM8--.
Column 25, line 32 "lump" should be --jump--.
Column 26, line 31 "MEM5-MEMS" should be --MEM5-MEM8--.
Column 30, Claim 26, Line 50 "coles" should be --columns--.
Column 33, Claim 47, line 56 "coles" should be --columns--.
```

UNITED STATES PATENT AND TRADEMARK OFFICE
CERTIFICATE OF CORRECTION

PATENT NO. : 5,557,734
DATED : Sept. 17, 1996
INVENTOR(S) : Wilson

It is certified that error appears in the above-indentified patent and that said Letters Patent is hereby corrected as shown below:

Column 33, Claim 47, line 58 "coles" should be --columns--.

Signed and Sealed this

Thirteenth Day of May, 1997

Attest:

BRUCE LEHMAN

Attesting Officer

Commissioner of Patents and Trademarks